(12) United States Patent
Yata et al.

(10) Patent No.: US 10,310,356 B2
(45) Date of Patent: Jun. 4, 2019

(54) OPTICAL DEVICE AND DISPLAY DEVICE

(71) Applicant: Japan Display Inc., Minato-ku (JP)

(72) Inventors: Tatsuya Yata, Tokyo (JP); Takayuki Nakanishi, Tokyo (JP); Takeo Koito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/924,359

(22) Filed: Mar. 19, 2018

(65) Prior Publication Data

US 2018/0284560 A1    Oct. 4, 2018

(30) Foreign Application Priority Data

Mar. 31, 2017  (JP) ................. 2017-071361

(51) Int. Cl.
  *G02F 1/1335*  (2006.01)
  *G02F 1/29*  (2006.01)
  *G02F 1/1343*  (2006.01)
  *G02F 1/1337*  (2006.01)

(52) U.S. Cl.
  CPC .......... *G02F 1/293* (2013.01); *G02F 1/13362* (2013.01); *G02F 1/13439* (2013.01); *G02F 1/133526* (2013.01); *G02F 1/133553* (2013.01); *G02F 1/134309* (2013.01); *G02F 1/1337* (2013.01); *G02F 2201/121* (2013.01); *G02F 2201/123* (2013.01)

(58) Field of Classification Search
  CPC ...................................... G02B 27/22
  See application file for complete search history.

(56) References Cited

U.S. PATENT DOCUMENTS

| 2005/0243237 | A1 | 11/2005 | Sasuga |
| 2006/0098296 | A1 | 5/2006 | Woodgate et al. |
| 2006/0152812 | A1 | 7/2006 | Woodgate et al. |
| 2006/0164593 | A1 | 7/2006 | Peyghambarian et al. |
| 2012/0154270 | A1* | 6/2012 | Numao ............... H04N 5/72 345/156 |

FOREIGN PATENT DOCUMENTS

| JP | 2005-317879 | 11/2005 |
| JP | 2006-516753 | 7/2006 |
| JP | 2007-264321 | 10/2007 |
| JP | 2007-535686 | 12/2007 |
| JP | 2008-529064 | 7/2008 |

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, an optical device includes a liquid crystal element including a first substrate including a plurality of first control electrodes, a second substrate which is opposed to the first substrate and comprises a second control electrode, and a first liquid crystal layer held between the first substrate and the second substrate, and a modulation element opposed to the liquid crystal element, the modulation element including a modulation portion which modulates incident light, and a non-modulation portion which is adjacent to the modulation portion.

15 Claims, 22 Drawing Sheets

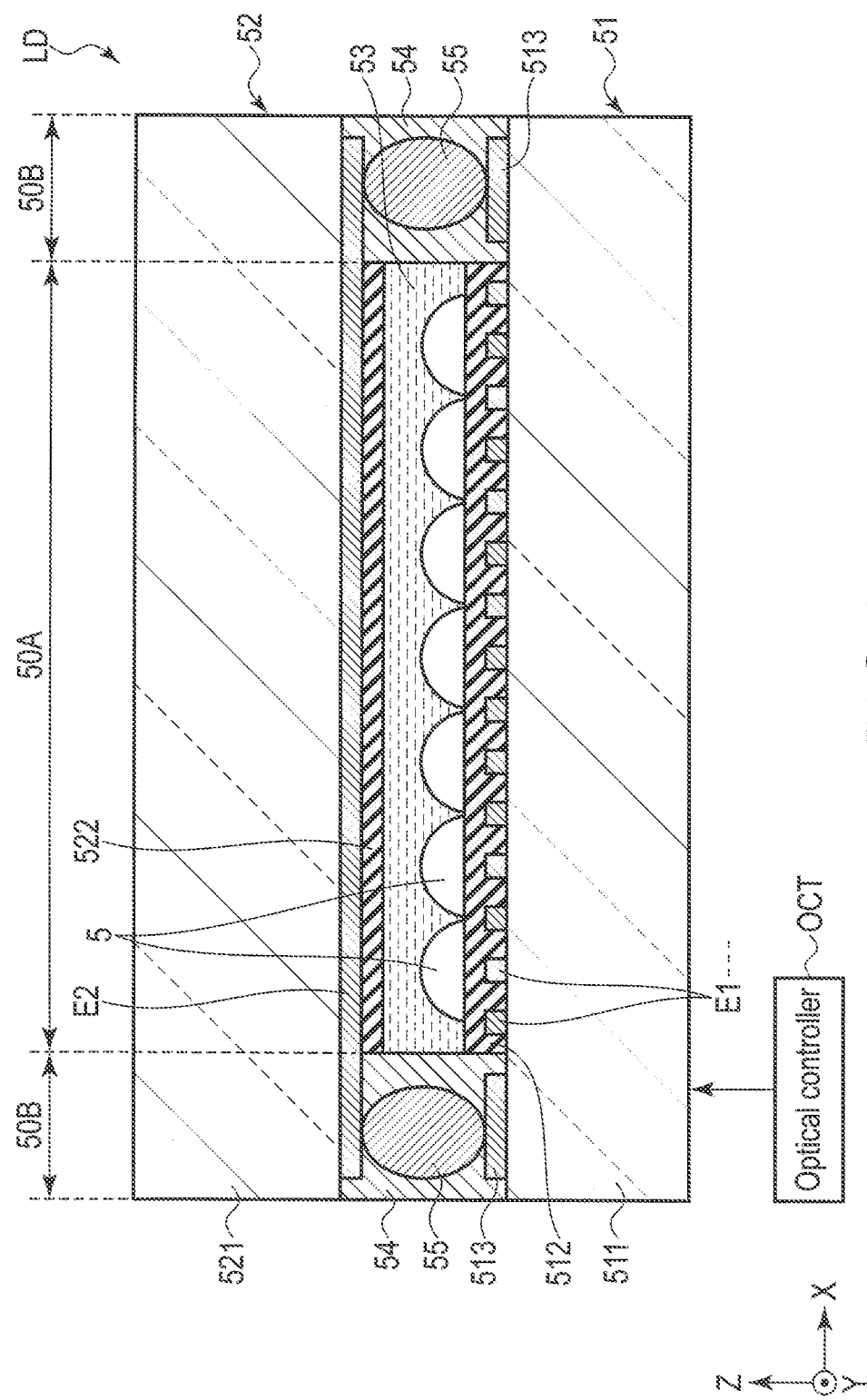
F I G. 2

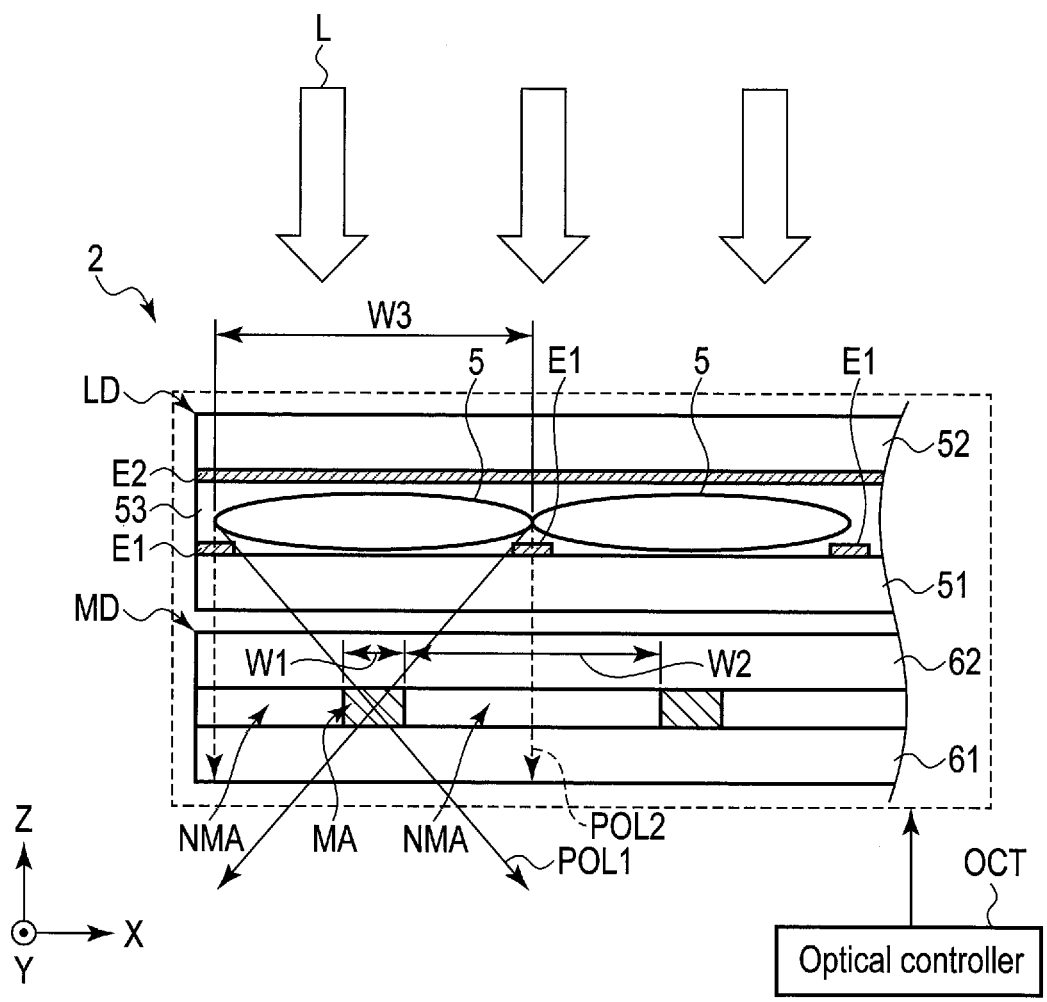
F I G. 6

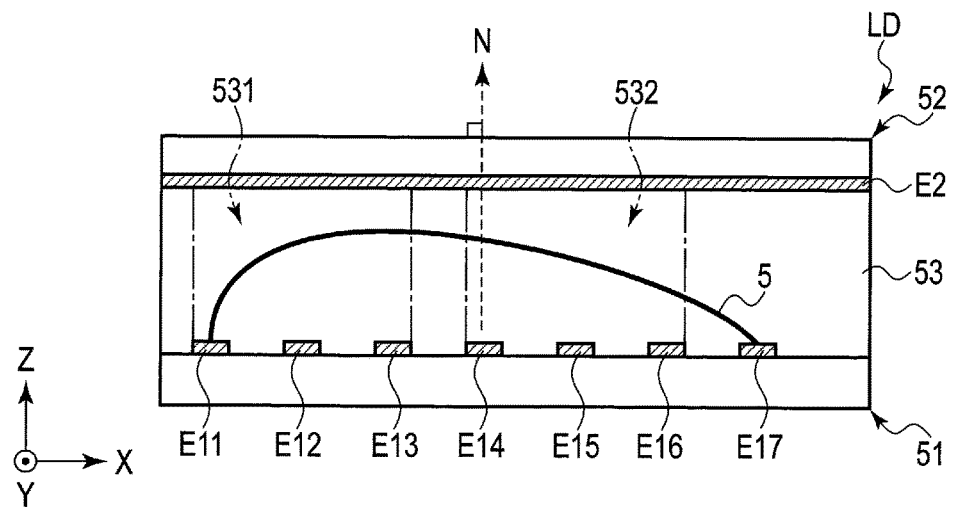
F I G. 8
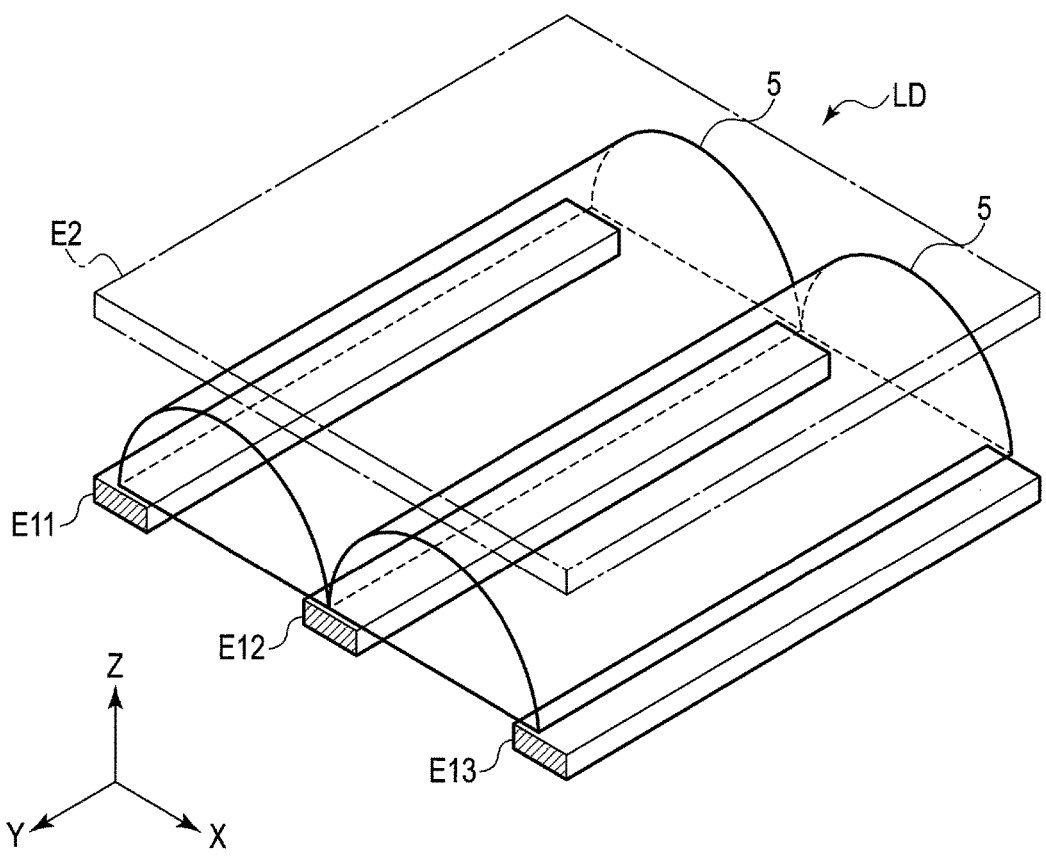
F I G. 9

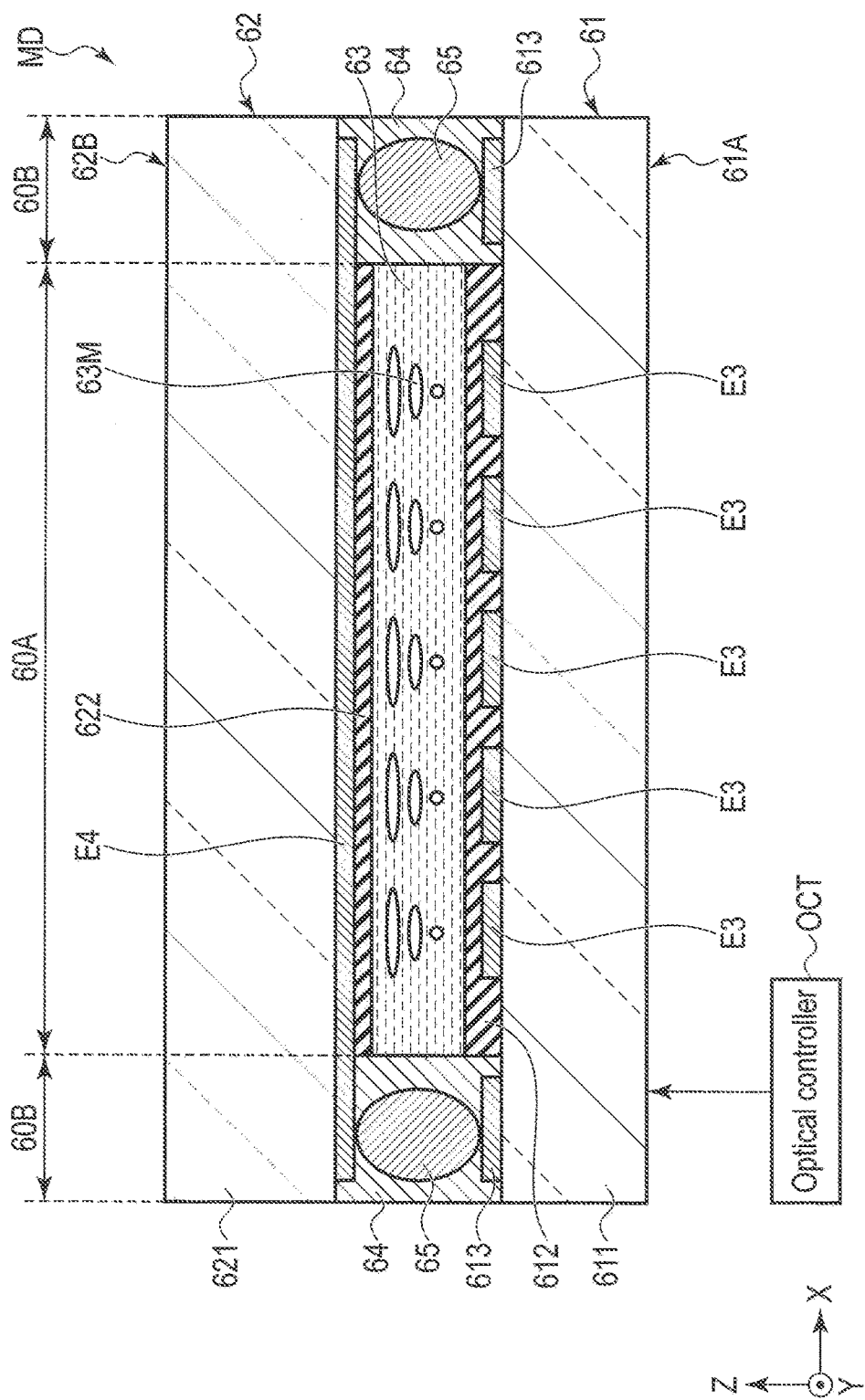
F I G. 14

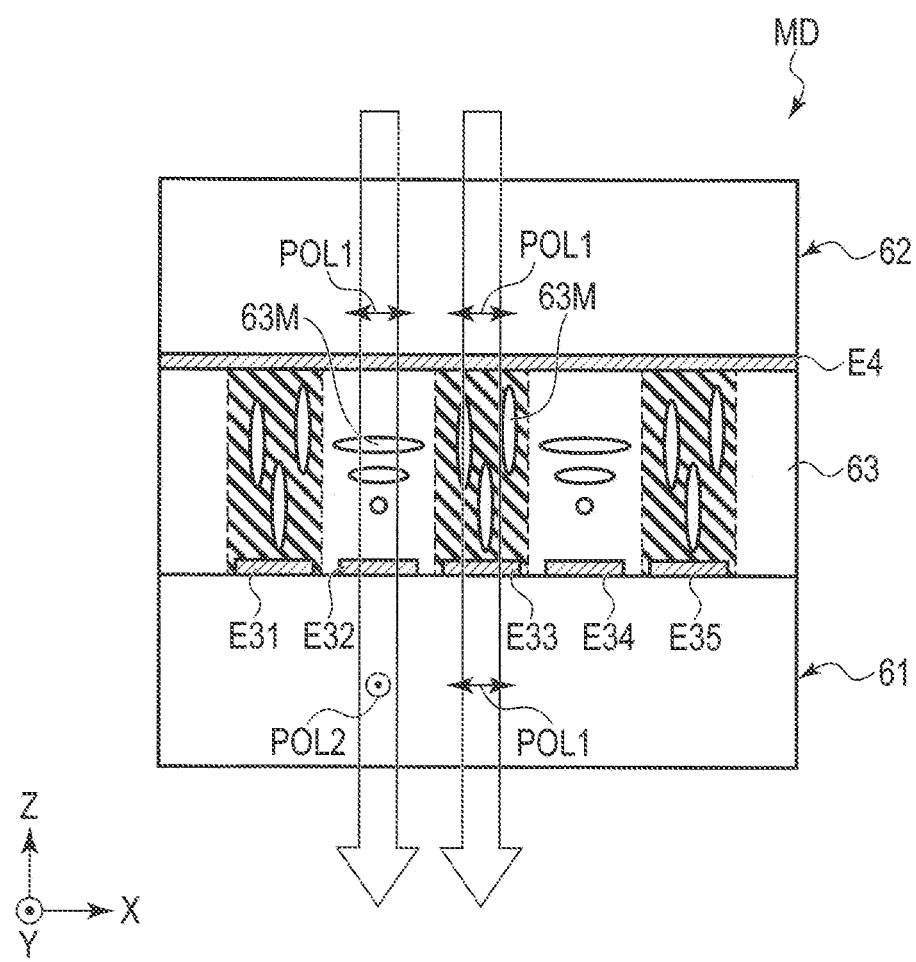
F I G. 15

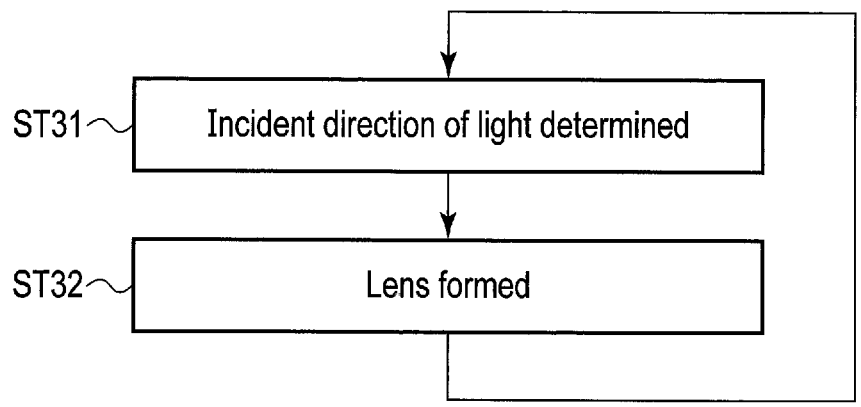
F I G. 17
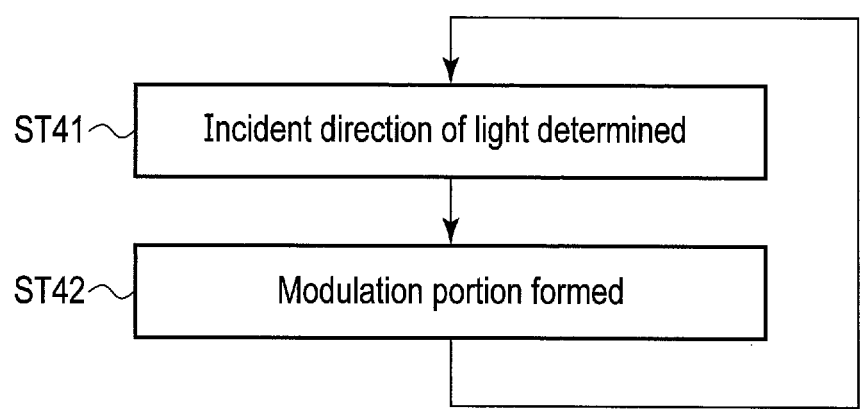
F I G. 18

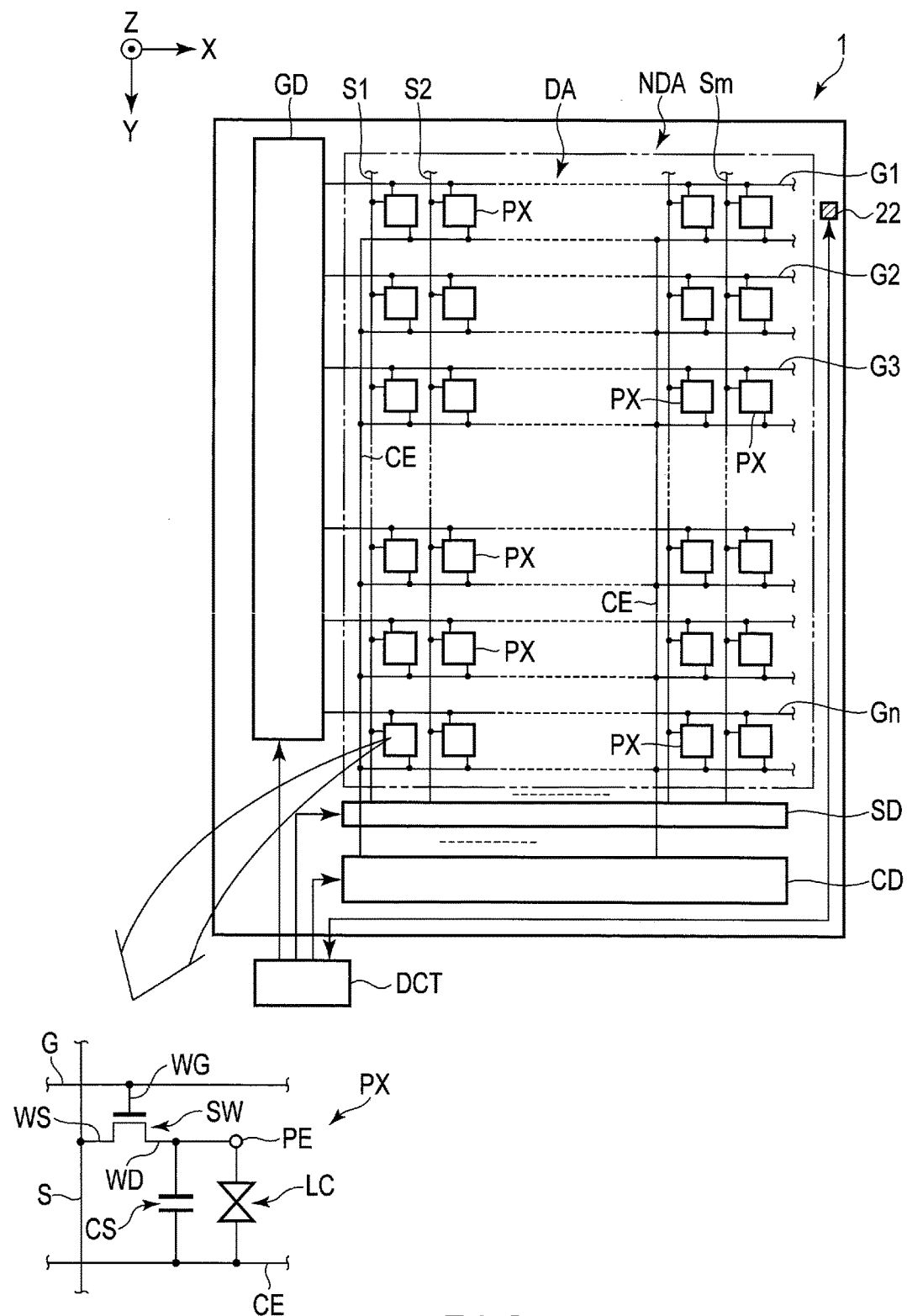
F I G. 19

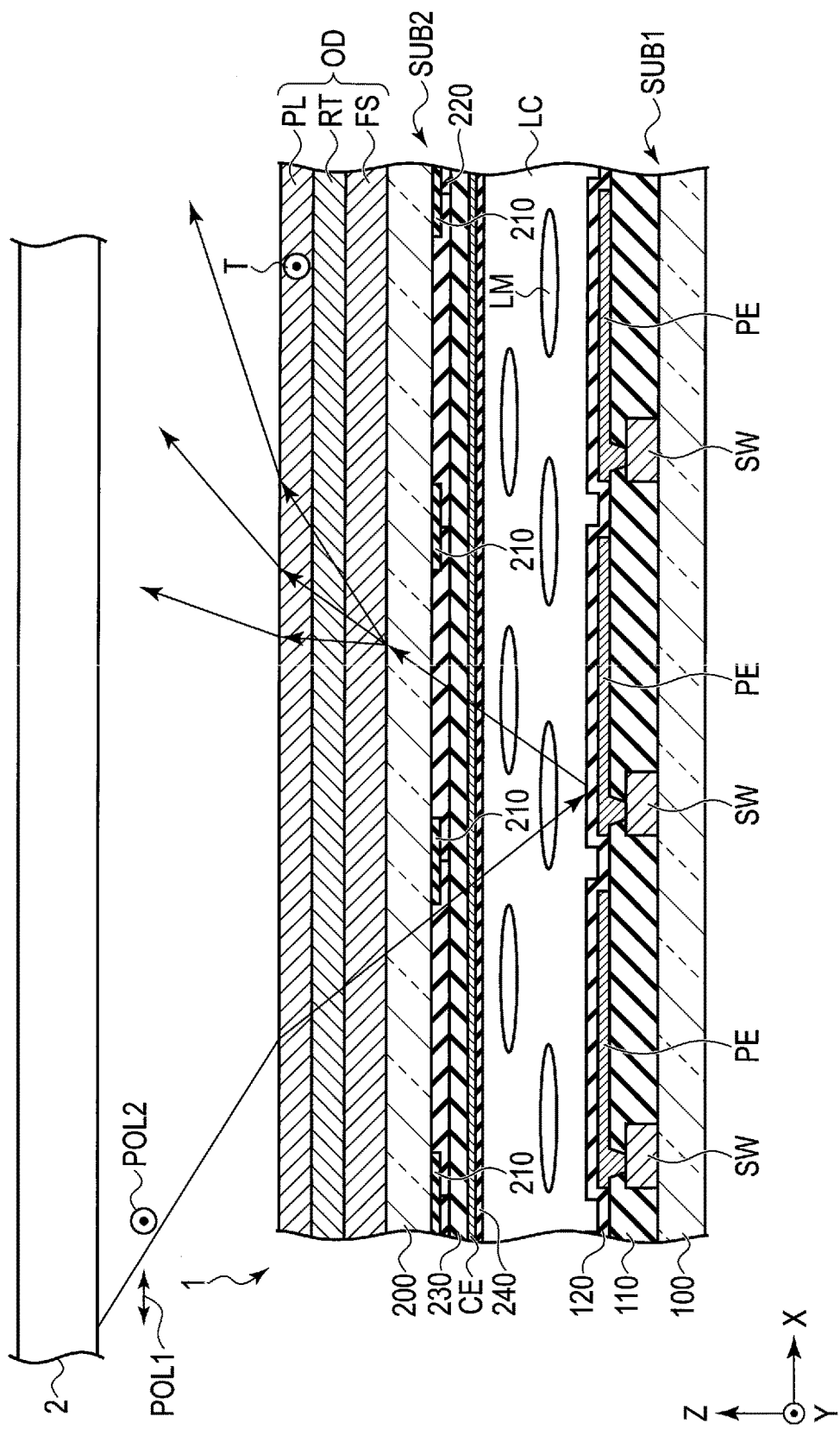
F I G. 20

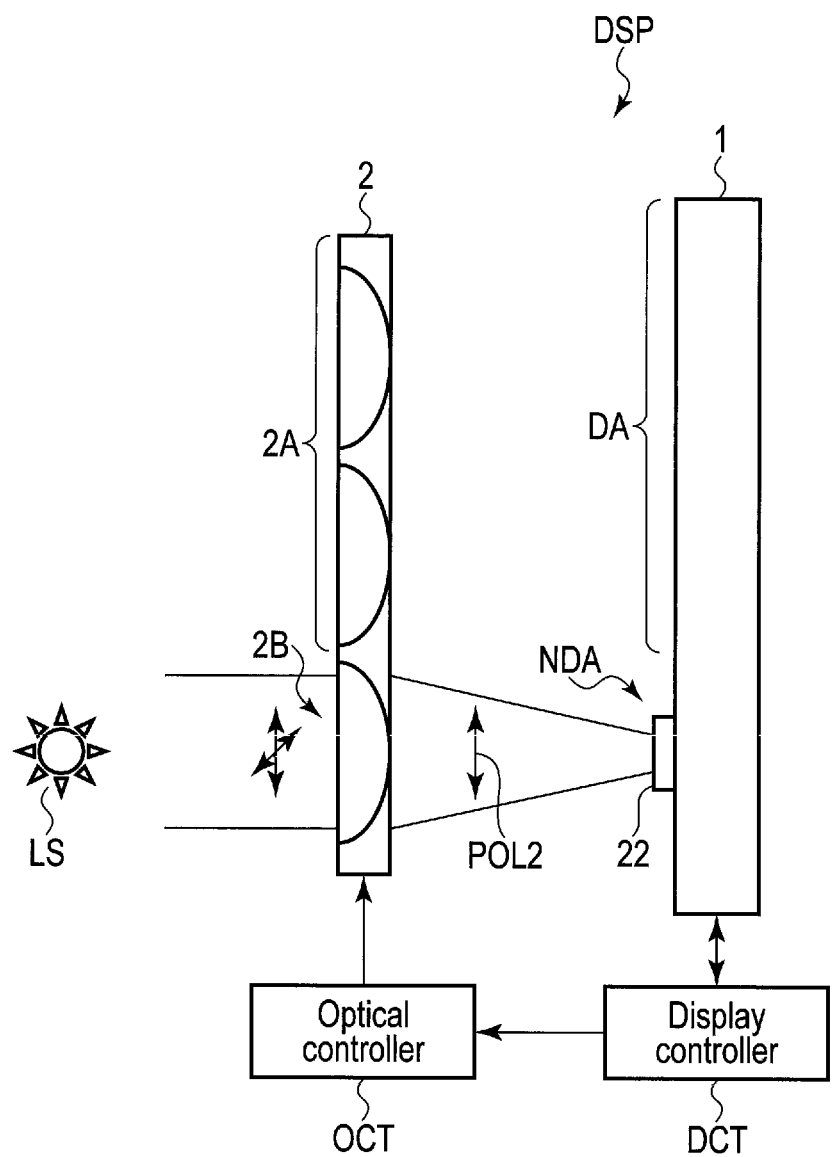
F I G. 21

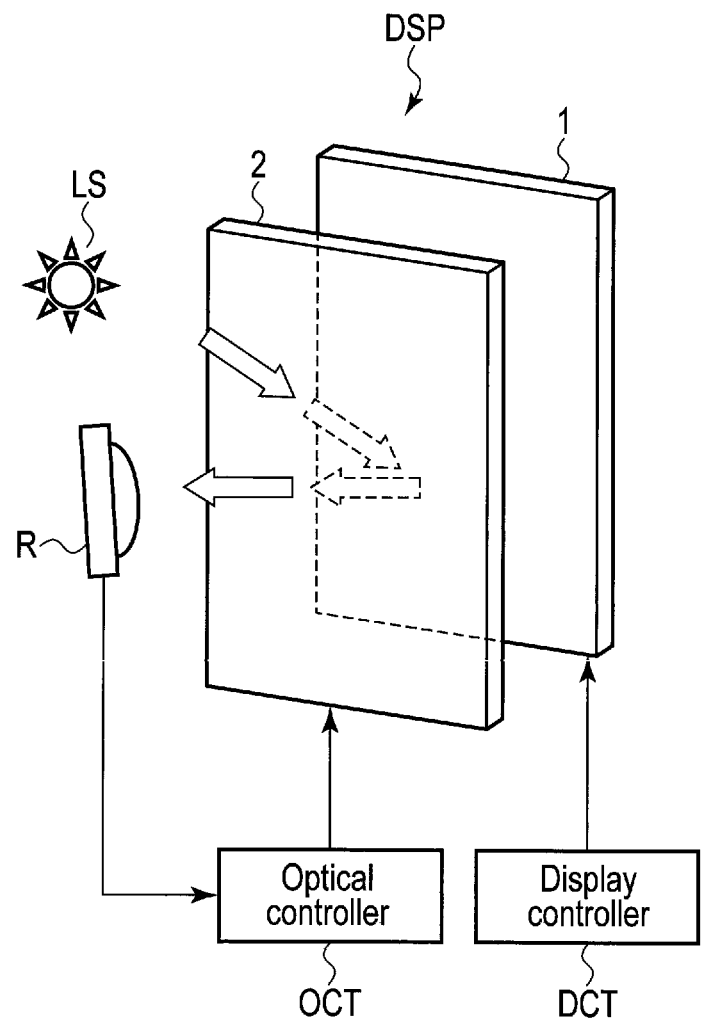
F I G. 22

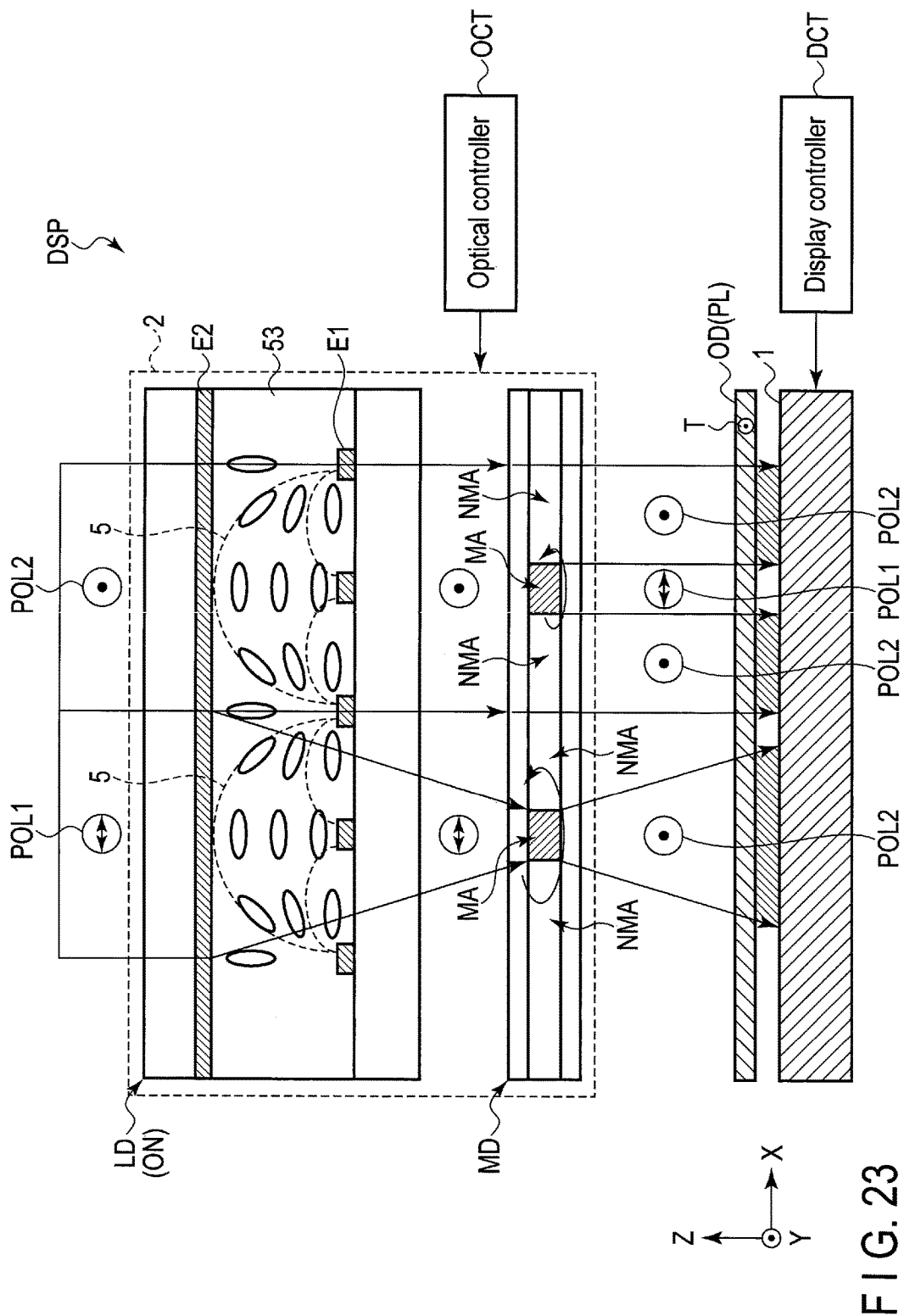
F I G. 23

| Gradation value | Reflectance (incident light amount 100%) | Reflectance (incident light amount 50%) |
|---|---|---|
| 0 | 0 % | 0 % |
| 1 | 33.3 % | 16.6 % |
| 2 | 66.6 % | 33.3 % |
| 3 | 100 % | 50 % |

OPTICAL DEVICE AND DISPLAY DEVICE

CROSS-REFERENCE TO RELATED APPLICATIONS

This application is based upon and claims the benefit of priority from Japanese Patent Application No. 2017-071361, filed Mar. 31, 2017, the entire contents of which are incorporated herein by reference.

FIELD

Embodiments described herein relate generally to an optical device and a display device.

BACKGROUND

For example, an image display device comprising a diffusion-control liquid crystal panel and a liquid crystal display panel has been proposed. The diffusion-control liquid crystal panel can switch a state between a lens formation state of diffusing linearly polarized light, oscillating in a predetermined direction, of light having directivity in a specific direction, and a non-lens formation state of transmitting the light while maintaining the directivity of the light. In the lens formation state, a plurality of small liquid crystal micro-lenses are formed by applying a voltage to a liquid crystal layer.

Apart from the above, various technologies for forming the lenses in the liquid crystal layer are known.

BRIEF DESCRIPTION OF THE DRAWINGS

FIG. 2 is a cross-sectional view showing a configuration example of the liquid crystal element LD.

FIG. 6 is an illustration showing a configuration example of an optical device 2 shown in FIG. 1.

FIG. 8 is an illustration for explaining another shape of the lens 5 formed in the first liquid crystal layer 53.

FIG. 9 is an illustration showing an example of the shape of the lens 5.

FIG. 14 is a cross-sectional view showing a configuration example of the modulation element MD.

FIG. 15 is an illustration for explaining a modulation portion MA and a non-modulation portion NMA formed in the modulation element MD.

FIG. 17 is an illustration for explaining a first control example related to the liquid crystal element LD.

FIG. 18 is an illustration for explaining a second control example related to the modulation element MD.

FIG. 19 is an illustration showing a basic structure and an equivalent circuit of the display panel 1.

FIG. 20 is a cross-sectional view showing a configuration example of a display panel 1 shown in FIG. 19.

FIG. 21 is an illustration for explaining a method of determining a drive condition of the optical device 2 in the display device DSP of the present embodiment.

FIG. 22 is an illustration for explaining another method of determining the drive condition of the optical device 2 in the display device DSP of the present embodiment.

FIG. 23 is an illustration showing the optical device 2 controlled such that an amount of light incident on the display panel 1 is maximized.

DETAILED DESCRIPTION

Figure 1:
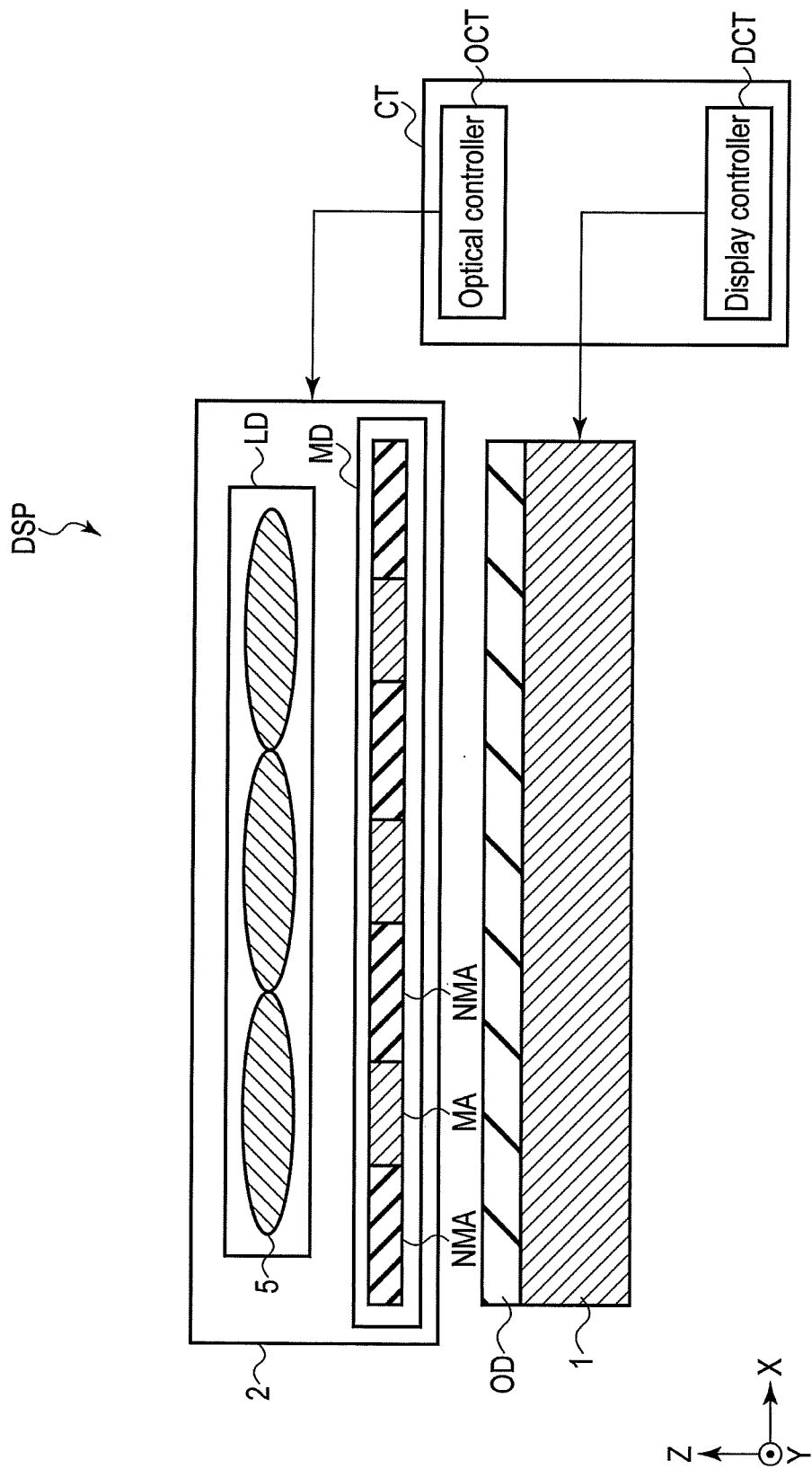
FIG. 1 is an illustration showing a configuration example of a display device DSP of the present embodiment.

In general, according to one embodiment, an optical device includes a liquid crystal element comprising a first substrate comprising a plurality of first control electrodes, a second substrate which is opposed to the first substrate and comprises a second control electrode, and a first liquid crystal layer held between the first substrate and the second substrate; and a modulation element opposed to the liquid crystal element, the modulation element comprising a modulation portion which modulates incident light, and a non-modulation portion which is adjacent to the modulation portion.

According to another embodiment, a display device includes a liquid crystal element comprising a first substrate comprising a plurality of first control electrodes, a second substrate which is opposed to the first substrate and comprises a-second control electrode, and a first liquid crystal layer held between the first substrate and the second substrate; a modulation element which is opposed to the liquid crystal element, the modulation element comprising a modulation portion which modulates first polarized light and second polarized light, and a non-modulation portion which is adjacent to the modulation portion; an optical element which is opposed to the modulation element, and transmits the second polarized light; and a liquid crystal display panel which is opposed to the optical element, and is illuminated by the second polarized light.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, and redundant detailed description thereof is omitted unless necessary.

FIG. 1 is an illustration showing a configuration example of a display device DSP of the present embodiment. While a first direction X, a second direction Y, and a third direction Z in the drawing are orthogonal to each other, they may cross each other at an angle other than 90 degrees.

The display device DSP comprises a display panel 1, an optical device 2, and an optical element OD. In one example, the display panel 1 is a liquid crystal display panel. The optical device 2 comprises a liquid crystal element LD comprising a lens 5, and a modulation element MD comprising a modulation portion MA and a non-modulation portion NMA. The liquid crystal element LD and the modulation element MD are opposed to each other in the third direction Z. The optical element OD and the modulation element MD are opposed to each other in the third direction Z. The display panel 1 and the optical element OD are opposed to each other along the third direction Z. The display panel 1, the optical element OD, the modulation element MD, and the liquid crystal element LD are arranged along the third direction Z in this order.

A plurality of lenses 5 are arranged in the first direction X, for example. A plurality of modulation portions MA are arranged at intervals in the first direction X. The modulation portion MA is located between the optical element OD and the lens 5. The non-modulation portion NMA is adjacent to the modulation portion MA. In the example illustrated, the modulation portions MA and the non-modulation portions NMA are arranged alternately along the first direction X. Note that the modulation portion MA and the non-modulation portion NMA may be fixed at predetermined positions, or may be structured to vary their positions. Further, the lens 5 may be fixed at a predetermined position, or may be structured to vary its position.

A controller CT comprises a display controller DCT and an optical controller OCT. The display controller DCT controls the display panel 1. The optical controller OCT controls the optical device 2.

FIG. 2 is a cross-sectional view showing a configuration example of the liquid crystal element LD.

The liquid crystal element LD comprises a first substrate 51, a second substrate 52, a first liquid crystal layer 53, a first control electrode E1, and a second control electrode E2. In the example illustrated, the first control electrode E1 is provided on the first substrate 51, and the second control electrode E2 is provided on the second substrate 52. However, the first control electrode E1 and the second control electrode E2 may both be provided on the same substrate, that is, on the first substrate 51 or the second substrate 52.

The first substrate 51 comprises a transparent insulating substrate 511, the first control electrode E1, an alignment film 512, and a feeder 513. The first control electrode E1 is located between the insulating substrate 511 and the first liquid crystal layer 53. The first control electrodes E1 are arranged at intervals in the first direction X in an effective area 50A. In one example, a width of each of the first control electrodes E1 along the first direction X is less than or equal to an interval between adjacent first control electrodes E1 along the first direction X. The alignment film 512 covers the first control electrodes E1, and is in contact with the first liquid crystal layer 53. The feeder 513 is located in a non-effective area 50B outside the effective area 50A.

The second substrate 52 comprises a transparent insulating substrate 521, the second control electrode E2, and an alignment film 522. The second control electrode E2 is located between the insulating substrate 521 and the first liquid crystal layer 53. The second control electrode E2 is, for example, a single plate electrode which is located on substantially the entire surface of the effective area 50A, and also extends to the non-effective area 50B. The second control electrode E2 is opposed to the first control electrode E1 with the first liquid crystal layer 53 interposed therebetween in the effective area 50A. The second control electrode E2 is opposed to the feeder 513 in the non-effective area 50B. The alignment film 522 covers the second control electrode E2, and is in contact with the first liquid crystal layer 53.

Each of the insulating substrates 511 and 521 is, for example, a glass substrate or a resin substrate.

Each of the first control electrode E1 and the second control electrode E2 is a transparent electrode formed of a transparent conductive material such as indium tin oxide (ITO) or indium zinc oxide (IZO). Each of the alignment films 512 and 522 is, for example, a horizontal alignment film, and is subjected to alignment treatment in the first direction X.

The first substrate 51 and the second substrate 52 are bonded to each other by a sealant 54 in the non-effective area 50B. The sealant 54 includes a conductive material 55. The conductive material 55 is interposed between the feeder 513 and the second control electrode E2, and electrically connects the feeder 513 and the second control electrode E2. The first liquid crystal layer 53 is held between the first substrate 51 and the second substrate 52. The first liquid crystal layer 53 is formed of, for example, a liquid crystal material having positive dielectric anisotropy. The first control electrode E1 and the second control electrode E2 apply, to the first liquid crystal layer 53, a voltage for forming the lens 5 in the first liquid crystal layer 53.

The optical controller OCT controls the voltage applied to the first liquid crystal layer 53. By controlling the voltage to be applied to each of the first control electrode E1 and the second control electrode E2, the optical controller OCT can switch a mode between a first mode in which the lens 5 is formed in the first liquid crystal layer 53 and a second mode in which a lens is not formed in the first liquid crystal layer 53. Further, by controlling the voltage to be applied to each of the first control electrodes E1, the optical controller OCT can control a position where the lens 5 is formed, and can switch a mode between a mode in which the lens 5 is formed at a first position of the first liquid crystal layer 53 and a mode in which the lens 5 is formed at a second position, which is different from the first position, of the first liquid crystal layer 53. Furthermore, by controlling the voltage to be applied to each of the first control electrodes E1, the optical controller OCT can switch a mode between a mode in which the lens 5 of a first shape is formed in the first liquid crystal layer 53 and a mode in which the lens 5 of a second shape, which is different from the first shape, is formed in the first liquid crystal layer 53. Moreover, by controlling the voltage to be applied to each of the first control electrodes E1, the optical controller OCT can switch a mode between a mode in which the lens 5 of a first size is formed in the first liquid crystal layer 53 and a mode in which the lens 5 of a second size, which is different from the first size, is formed in the first liquid crystal layer 53. The illustrated example corresponds to a case where a plurality of lenses 5 are formed in the first liquid crystal layer 53. However, a single lens 5 may be formed in the first liquid crystal layer 53.

Figure 3:
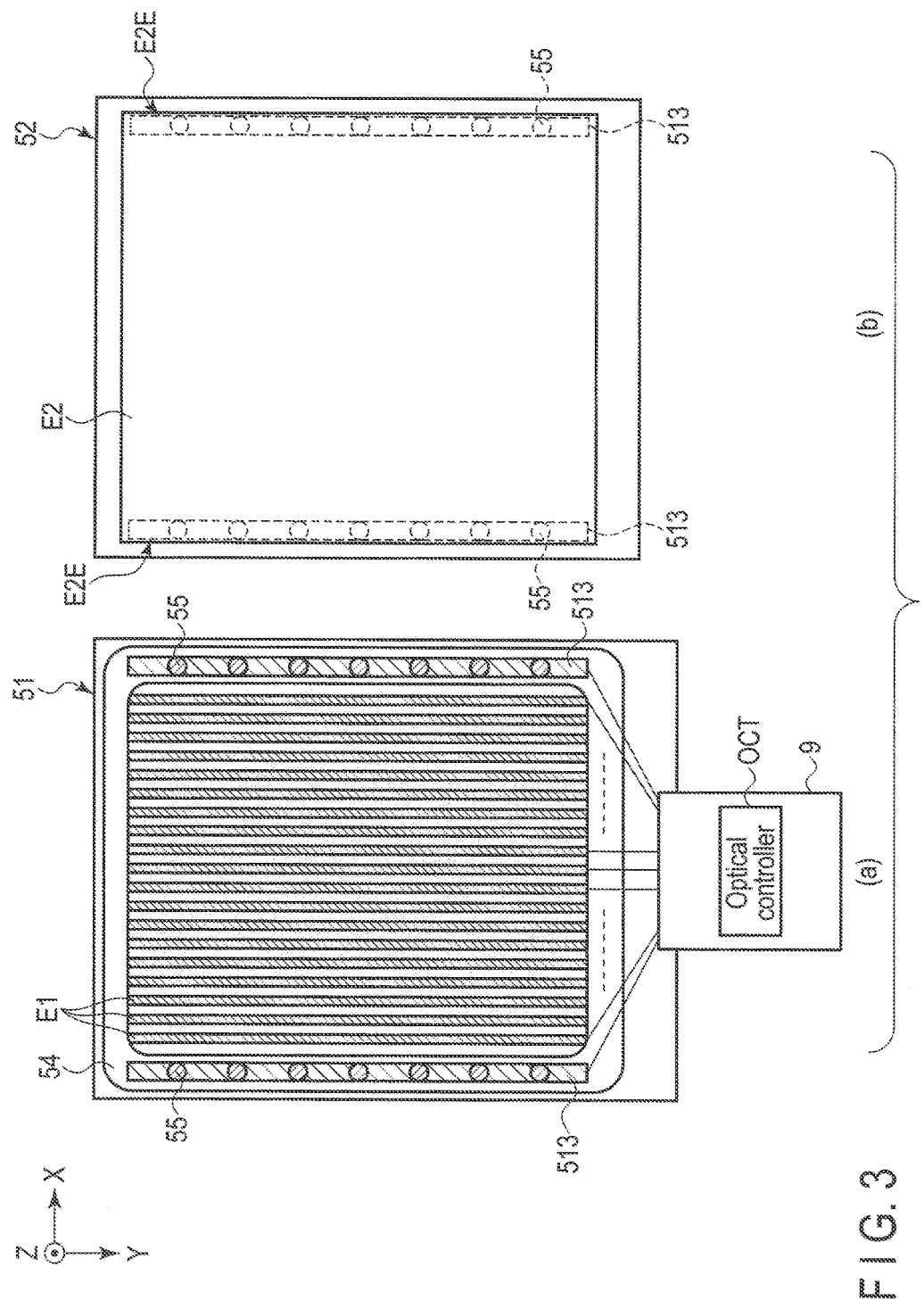
FIG. 3 is a plan view showing a configuration example of the liquid crystal element LD.

FIG. 3 is a plan view showing a configuration example of the liquid crystal element LD. FIG. 3(a) is a plan view of the first substrate 51, and FIG. 3(b) is a plan view of the second substrate 52.

In the first substrate 51 shown in FIG. 3(a), the sealant 54 is formed in a frame shape. The first control electrodes E1 are located at an inner side surrounded by the sealant 54, and are arranged at intervals in the first direction X. Each of the first control electrodes E1 is, for example, a strip electrode extending in the second direction Y. Alternatively, the first control electrodes E1 may each be a strip electrode extending in the first direction X, or may be island-shaped electrodes arranged in the first direction X and the second direction Y. The shape of the island-shaped electrode is polygonal, such as rectangular or hexagonal, or circular. The feeder 513 extends in the second direction Y at a position overlapping the sealant 54. At least a part of the conductive material 55 included in the sealant 54 overlaps the feeder 513. A wiring substrate 9 is connected to the first substrate 51, and electrically connects each of the first control electrodes E1 and the feeder 513 with the optical controller OCT.

In the second substrate 52 shown in FIG. 3(b), the second control electrode E2 is formed rectangular, and includes an end portion E2E extending in the second direction Y. The end portion E2E overlaps the feeder 513 and the conductive material 55. That is, the second control electrode E2 is electrically connected to the optical controller OCT via the conductive material 55 and the feeder 513.

Figure 4:
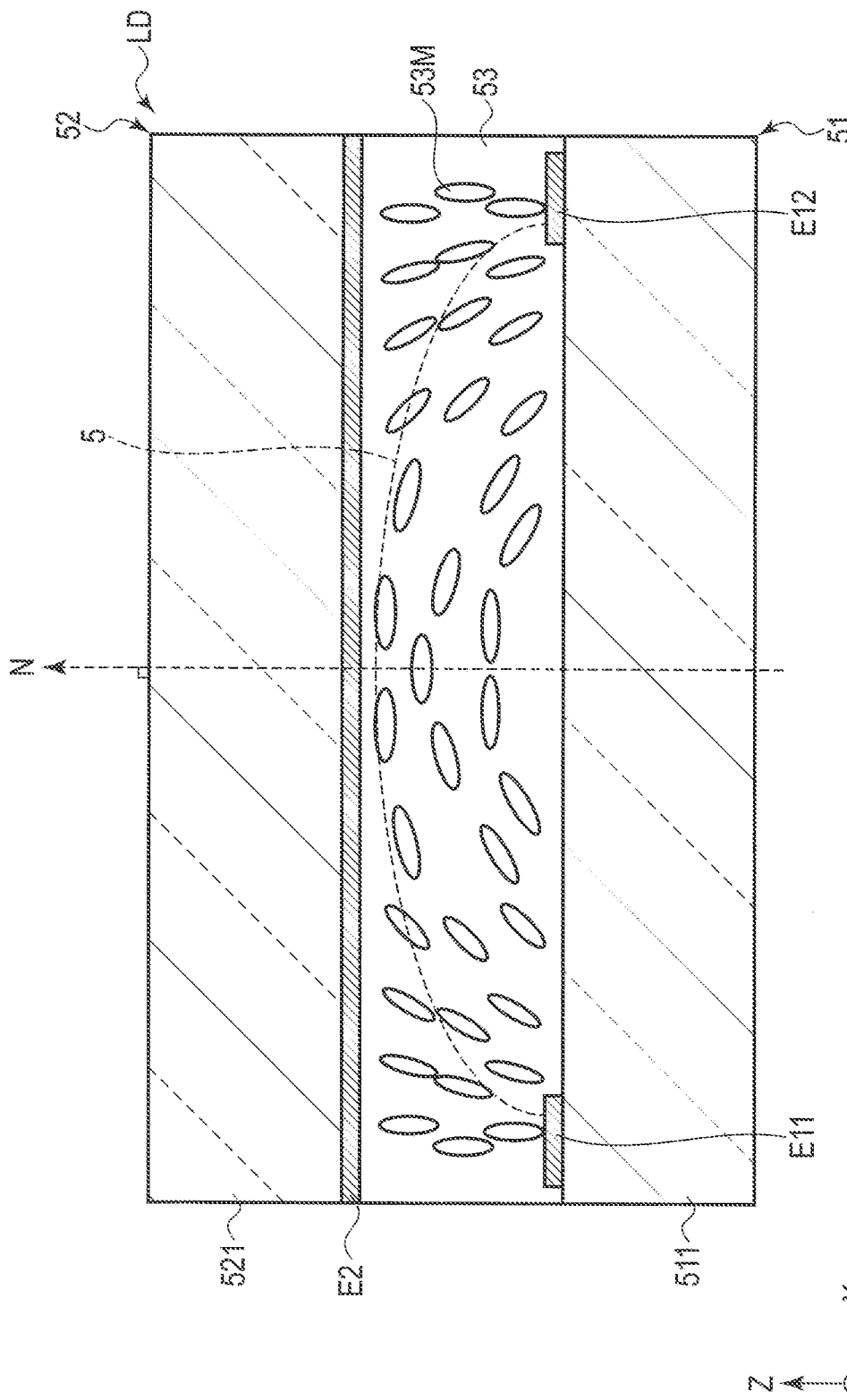
FIG. 4 is an illustration for explaining a lens 5 formed in a first liquid crystal layer 53.

FIG. 4 is an illustration for explaining the lens 5 formed in the first liquid crystal layer 53. FIG. 4 illustrates only the structures necessary for explanation. Here, a voltage, which is different from that applied to first control electrodes E11 and E12, is applied to the second control electrode E2 will be described.

In one example, as described above, the first liquid crystal layer 53 has positive dielectric anisotropy. Liquid crystal molecules 53M included in the first liquid crystal layer 53 are initially aligned such that their major axes are aligned in the first direction X in a state where an electric field is not formed, and are aligned such that their major axes are aligned along an electric field in a state where the electric field is formed.

In one example, a voltage of 6V is applied to the first control electrode E11, a voltage of −6V is applied to the first control electrode E12, and a voltage of 0V is applied to the second control electrode E2. In regions in which the first control electrodes E11 and E12 are opposed to the second control electrode E2, an electric field along the third direction Z is formed. Therefore, the liquid crystal molecules 53M are aligned such that their major axes are aligned along the third direction Z. In a region between the first control electrode E11 and the first control electrode E12, an electric field which is tilted with respect to the third direction Z is formed. Therefore, the liquid crystal molecules 53M are aligned such that their major axes are tilted with respect to the third direction Z. In an intermediate region, which is a region intermediate between the first control electrode E11 and the first control electrode E12, an electric field is hardly formed or an electric field along the first direction X is formed. Therefore, the liquid crystal molecules 53M are aligned such that their major axes are aligned along the first direction X. The liquid crystal molecule 53M has refractive anisotropy $\Delta n$. Accordingly, the first liquid crystal layer 53 has a refractive-index distribution according to an alignment state of the liquid crystal molecules 53M. In other words, the first liquid crystal layer 53 has a retardation distribution which is represented by $\Delta n \cdot d$ or a phase distribution, where d is a thickness of the first liquid crystal layer 53 along the third direction Z. Thickness d is, for example, 10 to 100 μm. The lens 5 shown by a dotted line in the drawing is one that is formed by the refractive-index distribution, retardation distribution, or phase distribution described above. The illustrated lens 5 functions as a convex lens. Also, the illustrated lens 5 has a shape that is symmetrical with respect to a normal N of the liquid crystal element LD. In the present embodiment, a system formed by a combination of the first liquid crystal layer 53 including liquid crystal molecules which are initially aligned substantially horizontally along a substrate main surface and an electric field formed along a direction intersecting the substrate main surface has been explained, as an example of the liquid crystal element LD comprising the lens 5. However, the liquid crystal element LD comprising the lens 5 is not limited to the above. For example, in forming the system, a liquid crystal layer including liquid crystal molecules which are initially aligned substantially perpendicularly to the substrate main surface may be combined, or an electric field formed along the substrate main surface may be combined. In other words, as long as the system can vary the refractive-index distribution according to an electric field applied to the liquid crystal layer, a liquid crystal element comprising the lens 5 can be realized. The substrate main surface mentioned above refers to an X-Y plane defined by the first direction X and the second direction Y.

Figure 5:
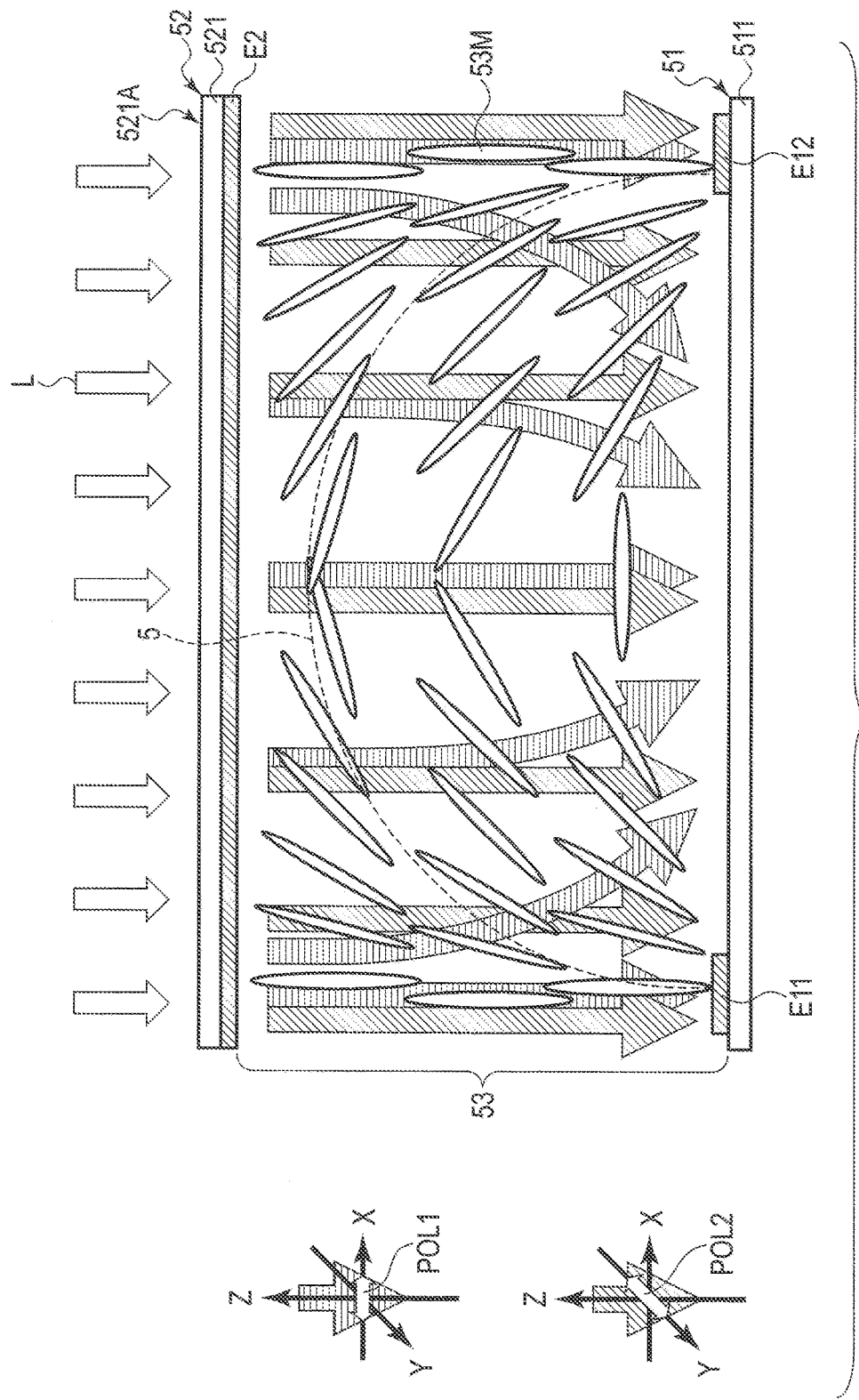
FIG. 5 is an illustration for explaining the function of the lens 5 shown in FIG. 4.

FIG. 5 is an illustration for explaining the function of the lens 5 shown in FIG. 4.

Here, when a traveling direction of light is along the third direction Z, linearly polarized light having an oscillation plane along the first direction X is referred to as first polarized light POL1, and linearly polarized light having an oscillation plane along the second direction Y is referred to as second polarized light POL2. Note that the traveling direction of light is opposite to a direction indicated by an arrow representing the third direction Z in the example illustrated. The first polarized light POL1 is shown by an arrow having a horizontal stripe pattern in the drawing, and the second polarized light POL2 is shown by an arrow having a slanting stripe pattern in the drawing. Light L is, for example, natural light having random oscillation planes, and is assumed to enter from an outer surface 521A of the insulating substrate 521, and travel from the second substrate 52 toward the first substrate 51.

The lens 5 has different functions on the first polarized light POL1 and the second polarized light POL2, respectively. That is, of the natural light L, the lens 5 transmits practically without refracting the second polarized light POL2, and refracts the first polarized light POL1. In other words, the lens 5 exhibits a convergence function on mainly the first polarized light POL1.

FIG. 6 is an illustration showing a configuration example of the optical device 2 shown in FIG. 1.

The modulation element MD comprises the modulation portion MA which modulates incident light, and the non-modulation portion NMA which is adjacent to the modulation portion MA. The modulation portion MA has the function of imparting a retardation to the incident light, and imparts, for example, a retardation of approximately $\lambda/2$ to the incident light. $\lambda$ indicates a wavelength of the incident light. When the incident light is linearly polarized light, the modulation portion MA as described above has the function of rotating a polarization plane of the linearly polarized light by approximately 90 degrees. For example, the modulation portion MA modulates the first polarized light POL1 and the second polarized light POL2 described above. More specifically, the modulation portion MA has the function of converting the first polarized light POL1 into the second polarized light POL2, and converting the second polarized light POL2 into the first polarized light POL1. The non-modulation portion NMA transmits practically without modulating the incident light.

The modulation element MD may be constituted by a liquid crystal element which can partially control the retardation, or may be constituted by a retardation film partially having a retardation. The modulation portion MA is smaller than the non-modulation portion NMA. In one example, a width W1 of the modulation portion MA along the first direction X is less than a width W2 of the non-modulation portion NMA along the first direction X. Although a detailed configuration example of the modulation element MD will be described later, in the example illustrated, the modulation element MD comprises a third substrate 61 and a fourth substrate 62. The modulation portion MA and the non-modulation portion NMA are both located between the third substrate 61 and the fourth substrate 62. When the modulation element MD is constituted by a liquid crystal element which will be described later, the modulation element MD is controlled by the optical controller OCT.

The liquid crystal element LD comprises the first substrate 51, the second substrate 52, and the first liquid crystal layer 53. The first control electrode E1 and the second control electrode E2 apply, to the first liquid crystal layer 53, a voltage for forming the lens 5 in the first liquid crystal layer 53. The liquid crystal element LD as described above is controlled by the optical controller OCT.

The lens 5 formed in the first liquid crystal layer 53 is opposed to the modulation element MD. In the modulation element MD, the modulation portion MA is arranged at a position where the light is converged by the lens 5. The width W1 of the modulation portion MA is less than a width W3 of the lens 5 along the first direction X (in other words, an interval between the first control electrodes E1 for forming the lens 5). Note that an arrow represented by a solid line in the drawing denotes the first polarized light POL1 having an oscillation plane along the first direction X, and an arrow represented by a dotted line in the drawing denotes the second polarized light POL2 having an oscillation plane along the second direction Y.

Figure 7:
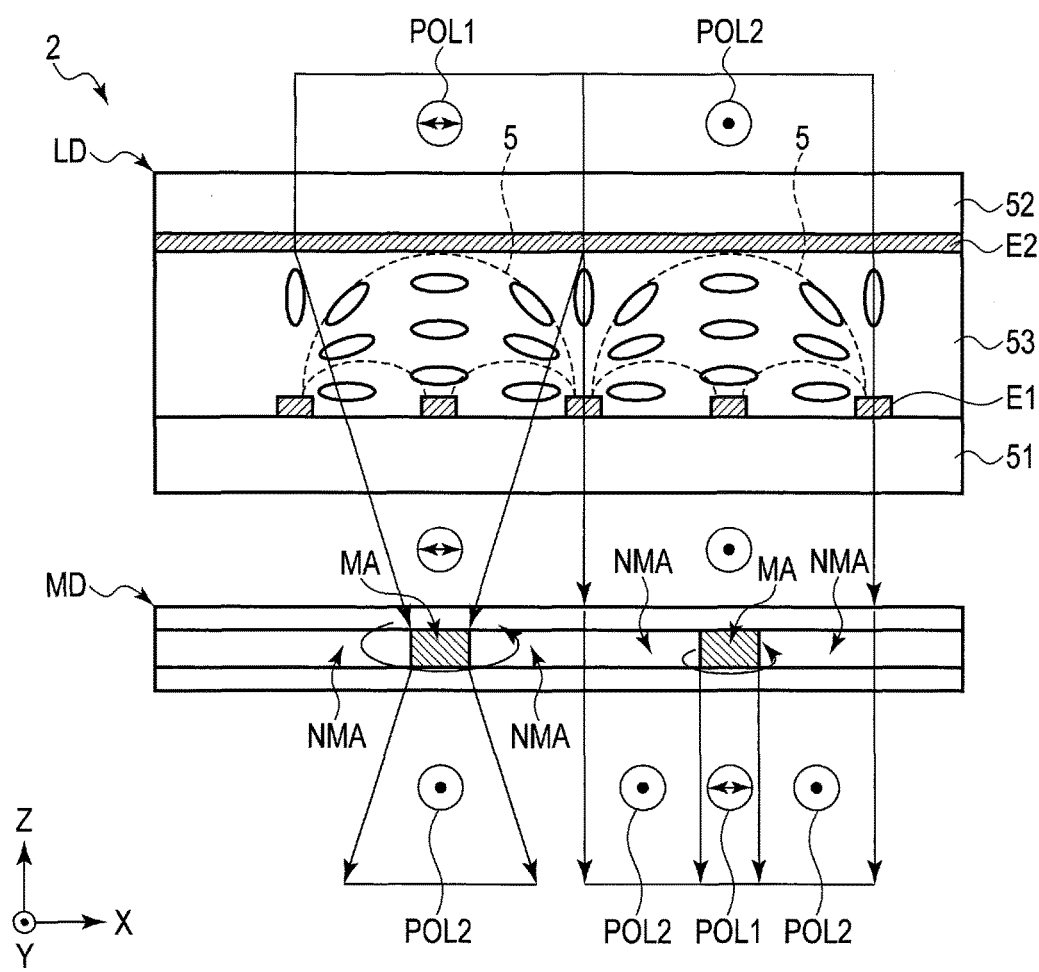
FIG. 7 is an illustration for explaining the function of the liquid crystal element LD and a modulation element MD shown in FIG. 6.

FIG. 7 is an illustration for explaining the function of the liquid crystal element LD and the modulation element MD shown in FIG. 6. Of the light incident on the liquid crystal element LD, the first polarized light POL1 is converged by the lens 5 and enters the modulation element MD, as shown on the left side of the drawing. Almost all of the first polarized light POL1 enters the modulation portion MA, and is converted into the second polarized light POL2. That is, the first polarized light POL1 which has entered the liquid crystal element LD is converted into the second polarized light POL2, and passes through the modulation element MD.

Meanwhile, of the light incident on the liquid crystal element LD, the second polarized light POL2 enters the modulation element MD practically without being converged by the lens 5, as shown on the right side of the drawing. The second polarized light POL2 enters the modulation portion MA and the non-modulation portion NMA. As stated above, since the non-modulation portion NMA is larger than the modulation portion MA, of the light incident on the modulation element MD, light incident on the non-modulation portion NMA is more than light incident on the modulation portion MA. In other words, most of the second polarized light POL2 which is incident on the modulation element MD is transmitted with its polarization plane unchanged because it passes through the non-modulation portion NMA which does not modulate the light. Part of the second polarized light POL2, which is incident on the modulation element MD, enters the modulation portion MA, and is converted into the first polarized light POL1. As described above, the second polarized light POL2 made incident on the liquid crystal element LD passes through the modulation element MD by mostly being maintained as the second polarized light POL2. In short, light transmitted through the lens 5 of the liquid crystal element LD, and light transmitted through the modulation element MD include the first polarized light POL1 and the second polarized light POL2. However, the ratio of the first polarized light POL1 in the light transmitted through the modulation element MD is smaller than the ratio of the first polarized light POL1 in the light transmitted through the liquid crystal element LD. Meanwhile, the ratio of the second polarized light POL2 in the light transmitted through the modulation element MD is larger than the ratio of the second polarized light POL2 in the light transmitted through the liquid crystal element LD.

As described above, according to the optical device 2 of the present embodiment, regardless of a direction of polarization of light incident on the liquid crystal element LD, the polarization directions of light which have passed through the modulation element MD can be made substantially uniform. In other words, when natural light having random oscillation planes enters the optical device 2, a predetermined polarization component can be increased without having part of the polarization component being absorbed, whereby the efficiency of use of light can be improved. Light beams whose polarization directions are uniform are suitable as the illumination light of a liquid crystal display panel, for example.

Next, an example of the shape of the lens 5 which can be formed in the liquid crystal element LD will be explained.

FIG. 8 is an illustration for explaining another shape of the lens 5 formed in the first liquid crystal layer 53. The first substrate 51 comprises first control electrodes E11 to E17 arranged at substantially regular intervals in the first direction X. The second control electrode E2 is opposed to the first control electrodes E11 to E17 with the first liquid crystal layer 53 interposed therebetween.

The illustrated lens 5 is a lens which is unsymmetrical with respect to the normal N. In a first region 531 on the left side of the drawing, that is, the region extending over the first control electrodes E11 to E13, and a second region 532 on the right side of the drawing, that is, the region extending over the first control electrodes E14 to E16, the lens 5 has different refractive-index distributions. Such a lens 5 can be formed by setting the voltages of the first control electrodes E11 to E17 to, for example, 6V, 2V, 0V, 1V, 3V, 5V and 6V, respectively, and setting the voltage of the second control electrode E2 to 0V.

FIG. 9 is an illustration showing an example of the shape of the lens 5. Here, an example of the shape of the lens 5 which can be formed by the liquid crystal element LD shown in FIG. 3 will be explained.

In one example, the first control electrodes E11 to E13 are arranged in the first direction X, and each of the first control electrodes E11 to E13 is a strip electrode extending in the second direction Y. Further, the second control electrode E2 is a single plate electrode extending in the X-Y plane.

The lens 5 is a convex lens (a cylindrical lens) which includes a curved surface having a generator extending along the second direction Y, and projects in the third direction Z. In a configuration example in which the lens 5 extends in the second direction Y as described above, the lens 5 can control the convergence position where the light is converged to be along the first direction X, in accordance with the incident angle of the incident light. Note that in a configuration example in which each of the first control electrodes E11 to E13 is a strip electrode extending in the first direction X, the lens 5 extending in the first direction X is formed. In a configuration example in which the lens 5 extends in the first direction X, the lens 5 can control the convergence position where the light is converged to be along the second direction Y, in accordance with the incident angle of the incident light.

Figure 10:
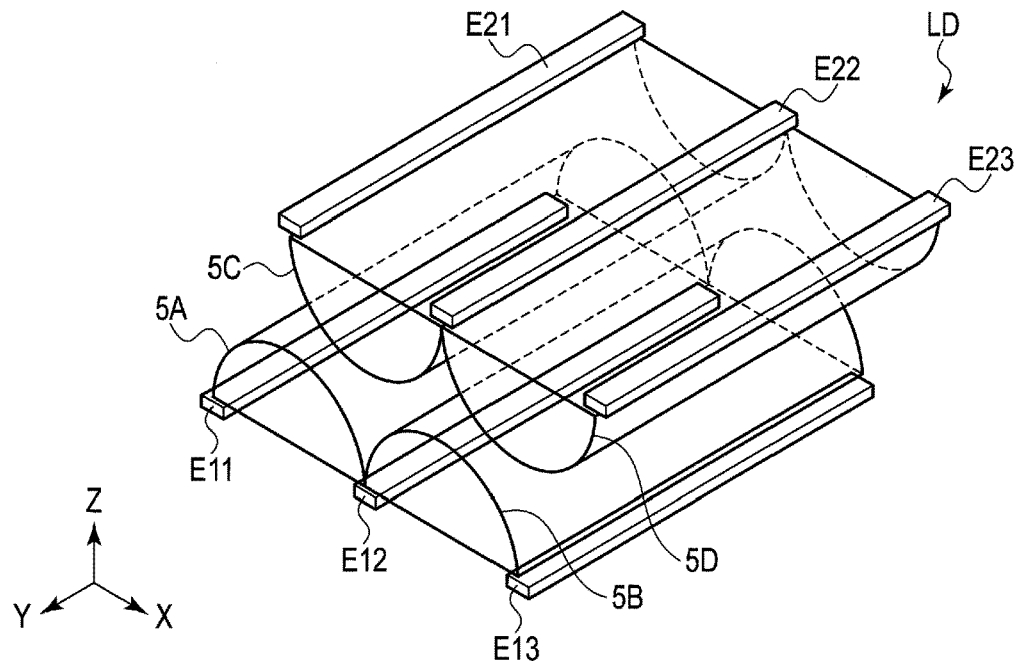
FIG. 10 is an illustration showing another example of the shape of the lens 5.

FIG. 10 is an illustration showing another example of the shape of the lens 5. The configuration example shown in FIG. 10 is different from the above configuration example in that a plurality of second control electrodes E21 to E23 are arranged at intervals in the first direction X, and each of the second control electrodes E21 to E23 is a strip electrode extending in the second direction Y. In other words, the extending direction of the second control electrodes E21 to E23 is parallel to the extending direction of the first control electrodes E11 to E13.

In this configuration example, by applying a predetermined voltage mainly to each of the first control electrodes E11 to E13, lenses 5A and 5B are formed, and by applying a predetermined voltage mainly to each of the second control electrodes E21 to E23, lenses 5C and 5D are formed. Each of the lenses 5A and 5B is a convex lens including a curved surface having a generator extending along the second direction Y, and projecting upward along the third direction Z. Further, each of the lenses 5C and 5D is a convex lens including a curved surface having a generator extending along the second direction Y, and projecting downward along the third direction Z.

For example, by setting the voltage of each of the second control electrodes E21 to E23 to 0V, the voltage of each of the first control electrodes E11 and E13 to 6V, and the voltage of the first control electrode E12 to −6V, the lenses 5A and 5B can be formed without forming the lenses 5C and 5D. Similarly, by setting the voltage of each of the first control electrodes E11 to E13 to 0V, the voltage of each of the second control electrodes E21 and E23 to 6V, and the voltage of the second control electrode E22 to −6V, the lenses 5C and 5D can be formed without forming the lenses 5A and 5B. In addition, by setting the voltage of each of the first control electrodes E11 and E13 to −6V, and the voltage of the first control electrode E12 to +6V, and also setting the voltage of each of the second control electrodes E21 and E23 to −6V, and the voltage of the second control electrode E22 to +6V, the lenses 5A and 5B and the lenses 5C and 5D can be formed simultaneously.

Figure 11:
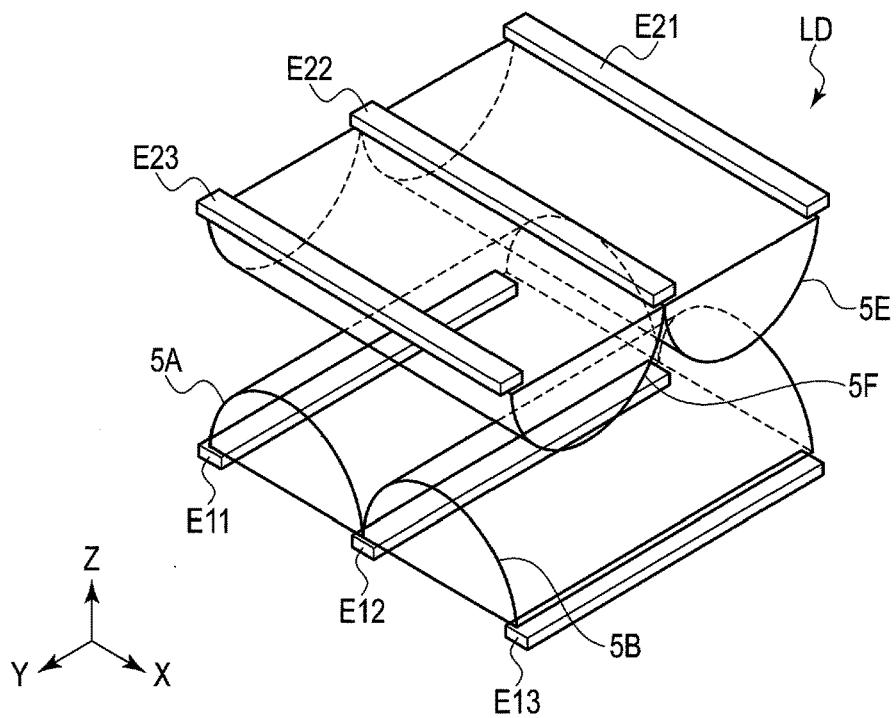
FIG. 11 is an illustration showing yet another example of the shape of the lens 5.

FIG. 11 is an illustration showing yet another example of the shape of the lens 5. The configuration example shown in FIG. 11 is different from the above configuration example in that the second control electrodes E21 to E23 are arranged at intervals in the second direction Y, and each of the second control electrodes E21 to E23 is a strip electrode extending in the first direction X. In other words, the extending direction of the second control electrodes E21 to E23 crosses the extending direction of the first control electrodes E11 to E13.

In this configuration example, by applying a predetermined voltage mainly to each of the first control electrodes E11 to E13, the lenses 5A and 5B are formed, and by applying a predetermined voltage mainly to each of the second control electrodes E21 to E23, the lenses 5E and 5F are formed. Each of the lenses 5A and 5B is a convex lens including a curved surface having a generator extending along the second direction Y, and projecting upward along the third direction Z. Further, each of the lenses 5E and 5F is a convex lens including a curved surface having a generator extending along the first direction X, and projecting downward along the third direction Z.

For example, by setting the voltage of each of the second control electrodes E21 to E23 to 0V, the voltage of each of the first control electrodes E11 and E13 to 6V, and the voltage of the first control electrode E12 to −6V, the lenses 5A and 5B can be formed without forming the lenses 5E and 5F. Similarly, by setting the voltage of each of the first control electrodes E11 to E13 to 0V, the voltage of each of the second control electrodes E21 and E23 to 6V, and the voltage of the second control electrode E22 to −6V, the lenses 5E and 5F can be formed without forming the lenses 5A and 5B.

Figure 12:
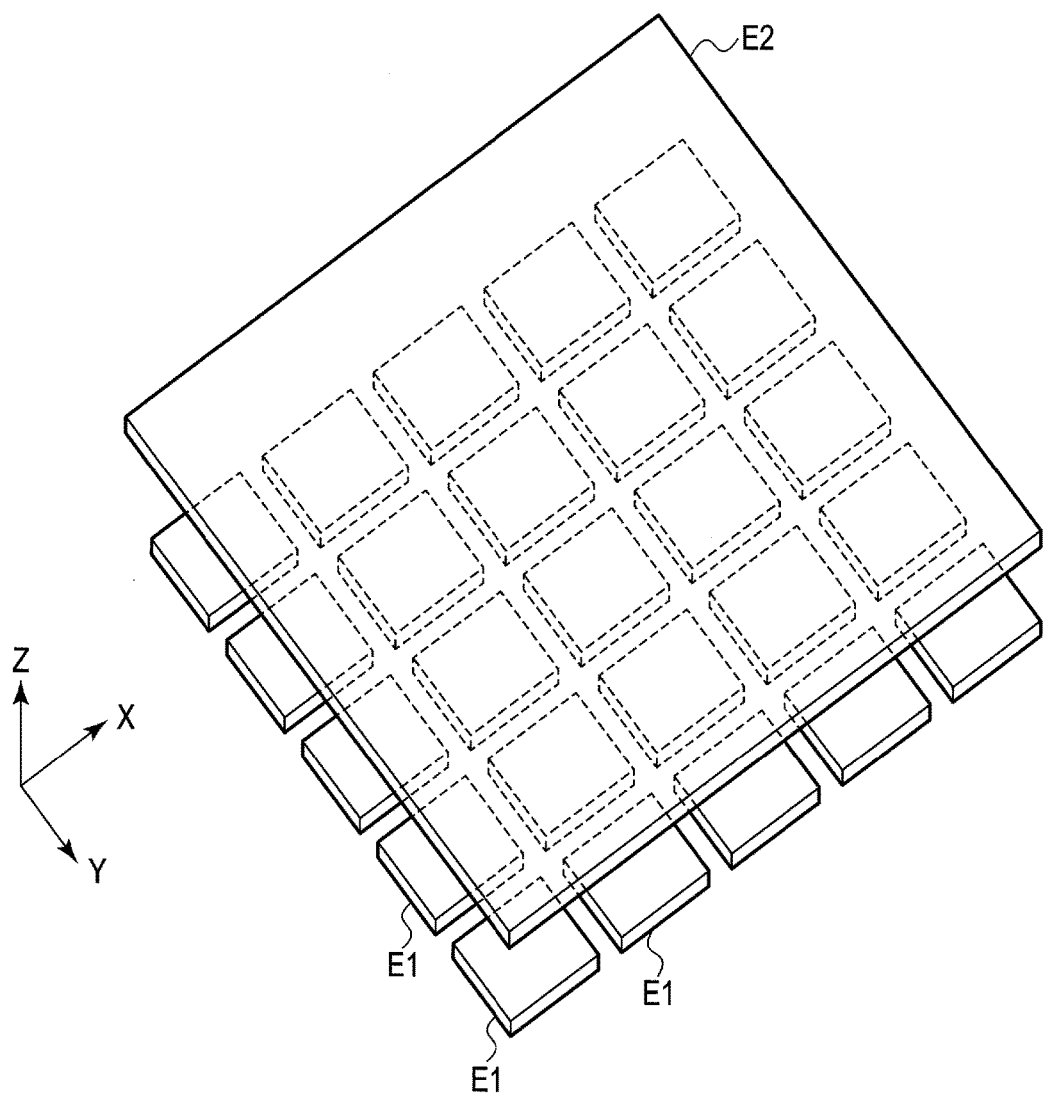
FIG. 12 is an illustration showing another configuration example of the liquid crystal element LD.

FIG. 12 is an illustration showing another configuration example of the liquid crystal element LD. The configuration example shown in FIG. 12 is different from the above configuration example in that a plurality of first control electrodes E1 are arranged in a matrix in the first direction X and the second direction Y, and the second control electrode E2 is a single plate electrode extending in the X-Y plane. The voltages of the first control electrodes E1 can be set independently. According to this configuration example, by controlling the voltage of each of the first control electrodes E1 arrayed in a matrix, an extending direction of the lens 5 can be changed freely.

Figure 13:
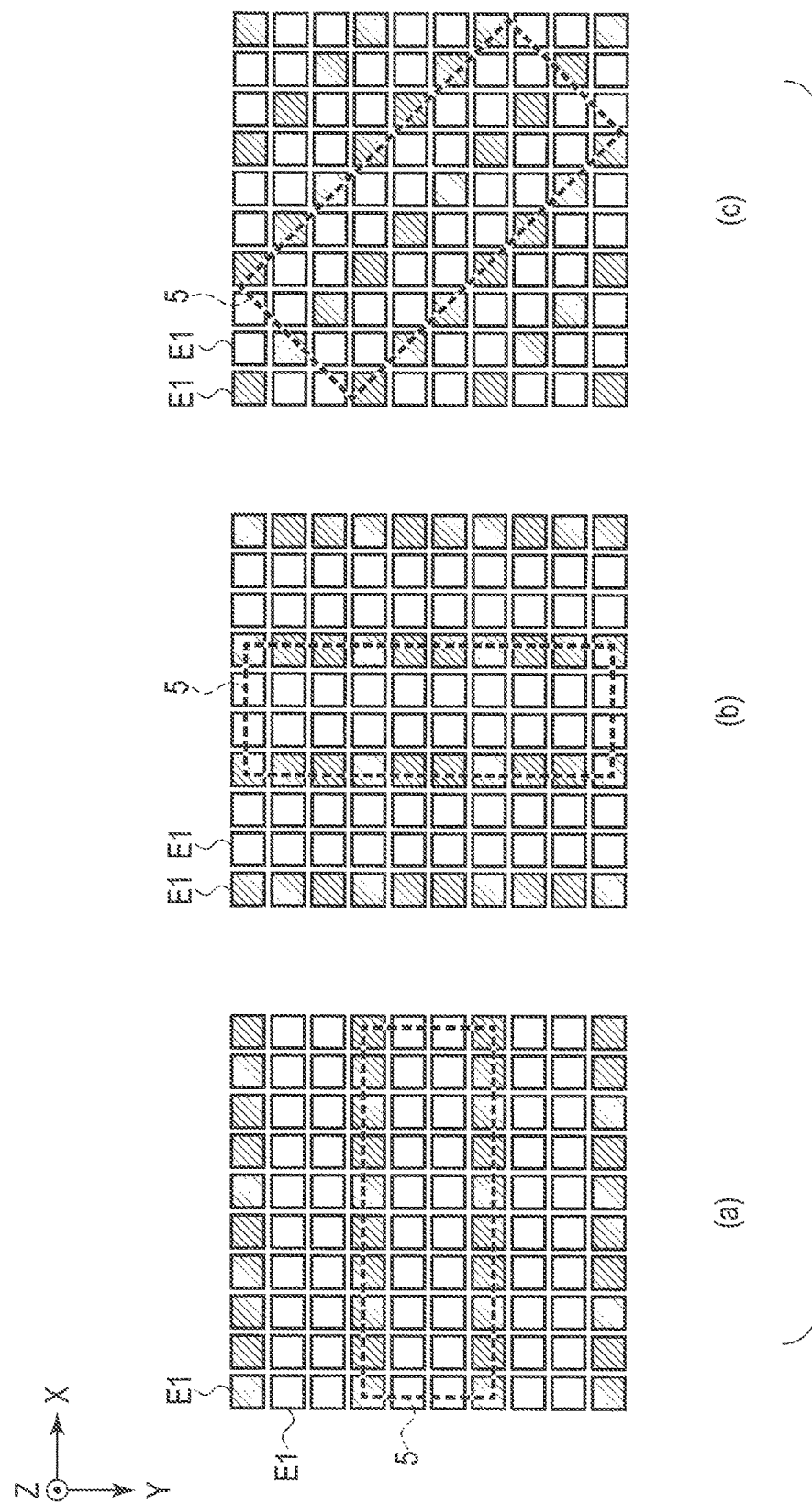
FIG. 13 is an illustration showing examples of the shape of the lens 5 which can be formed in the configuration example illustrated in FIG. 12.

FIG. 13 is an illustration showing examples of the shape of the lens 5 which can be formed in the configuration example illustrated in FIG. 12. In the drawing, squares having hatch patterns all represent the first control electrodes E1, which are set at the same first voltage, and squares not having hatch patterns all represent the first control electrodes E1, which are set at a second voltage different from the first voltage.

An example illustrated in FIG. 13(a) corresponds to a case where the voltages of the first control electrodes E1 arranged in the first direction X are set to be the same. In this example, the lens 5 extending along the first direction X is formed.

An example illustrated in FIG. 13(b) corresponds to a case where the voltages of the first control electrodes E1 arranged in the second direction Y are set to be the same. In this example, the lens 5 extending along the second direction Y is formed.

An example illustrated in FIG. 13(c) corresponds to a case where the voltages of the first control electrodes E1 arranged in an oblique direction which intersects the first direction X and the second direction Y are set to be the same. In this example, the lens 5 extending along the oblique direction is formed.

Next, a configuration example of the modulation element MD will be described.

FIG. 14 is a cross-sectional view showing a configuration example of the modulation element MD. Here, a case where the modulation element MD is constituted by a liquid crystal element will be described. The modulation element MD as described above is controlled by the optical controller OCT.

The modulation element MD comprises the third substrate 61, the fourth substrate 62, a second liquid crystal layer 63, a third control electrode E3, and a fourth control electrode E4. In the example illustrated, the third control electrode E3 is provided on the third substrate 61, and the fourth control electrode E4 is provided on the fourth substrate 62. However, the third control electrode E3 and the fourth control electrode E4 may both be provided on the same substrate, that is, on the third substrate 61 or the fourth substrate 62.

The third substrate 61 comprises a transparent insulating substrate 611, the third control electrode E3, an alignment film 612, and a feeder 613. The third control electrode E3 is located between the insulating substrate 611 and the second liquid crystal layer 63.

The third control electrodes E3 are arranged at intervals in the first direction X in an effective area 60A. In one example, a width of each of the third control electrodes E3 along the first direction X is greater than an interval between adjacent third control electrodes E3 along the first direction X. The alignment film 612 covers the third control electrodes E3, and is in contact with the second liquid crystal layer 63. The feeder 613 is located in a non-effective area 60B outside the effective area 60A.

The fourth substrate 62 comprises a transparent insulating substrate 621, the fourth control electrode E4, and an alignment film 622. The fourth control electrode E4 is located between the insulating substrate 621 and the second liquid crystal layer 63.

The fourth control electrode E4 is, for example, a single plate electrode which is located on substantially the entire surface of the effective area 60A, and also extends to the non-effective area 60B. The fourth control electrode E4 is opposed to the third control electrode E3 via the second liquid crystal layer 63 in the effective area 60A. The fourth control electrode E4 is opposed to the feeder 613 in the non-effective area 60B. The alignment film 622 covers the fourth control electrode E4, and is in contact with the second liquid crystal layer 63.

Each of the insulating substrates 611 and 621 is, for example, a glass substrate or a resin substrate. Each of the third control electrode E3 and the fourth control electrode E4 is formed of a transparent conductive material such as ITO or IZO. The third control electrode E3 is a strip electrode extending in the second direction Y likewise the first control electrode E1 shown in FIG. 3. The fourth control electrode E4 is a rectangular plate electrode likewise the second control electrode E2 shown in FIG. 3. Each of the alignment films 612 and 622 is, for example, a horizontal alignment film. In one example, the alignment film 612 is subjected to alignment treatment along the second direction Y, and the alignment film 622 is subjected to alignment treatment along the first direction X.

The third substrate 61 and the fourth substrate 62 are bonded to each other by a sealant 64 in the non-effective area 60B. The sealant 64 includes a conductive material 65. The conductive material 65 is interposed between the feeder 613 and the fourth control electrode E4, and electrically connects the feeder 613 and the fourth control electrode E4.

The second liquid crystal layer 63 is held between the third substrate 61 and the fourth substrate 62. The second liquid crystal layer 63 is formed of, for example, a liquid crystal material having positive dielectric anisotropy. The thickness of the second liquid crystal layer 63 is, for example, 2 to 4 μm. The third control electrode E3 and the fourth control electrode E4 apply a voltage for forming the modulation portion MA and the non-modulation portion NMA shown in FIG. 6 to the second liquid crystal layer 63.

The optical controller OCT controls the voltage to be applied to the second liquid crystal layer 63. As the optical controller OCT controls the voltage applied to each of the third control electrode E3 and the fourth control electrode E4, the modulation portion MA and the non-modulation portion NMA can be formed in the second liquid crystal layer 63. It should be noted that only the modulation portion MA can be formed in the second liquid crystal layer 63, or only the non-modulation portion NMA can be formed in the second liquid crystal layer 63. Further, as the optical controller OCT controls the voltage applied to each of the third control electrodes E3, the positions where the modulation portion MA and the non-modulation portion NMA are formed can be controlled. Furthermore, as the optical controller OCT controls the voltage applied to each of the third control electrodes E3, the size of the modulation portion MA and the non-modulation portion NMA can be controlled freely.

FIG. 15 is an illustration for explaining the modulation portion MA and the non-modulation portion NMA formed in the modulation element MD. FIG. 15 illustrates only the structures necessary for explanation. Here, a case where a voltage, which is different from that applied to the fourth control electrode E4, is applied to third control electrodes E31, E33, and E35, of a plurality of third control electrodes E31 to E35 arranged in the first direction X, will be described.

As described above, the second liquid crystal layer 63 has the positive dielectric anisotropy. Liquid crystal molecules 63M included in the second liquid crystal layer 63 are twisted-aligned by 90 degrees in a state where no electric field is formed. In other words, the liquid crystal molecules 63M near the third control electrodes E31 to E35 are initially aligned such that their major axes are aligned in the second direction Y, and the liquid crystal molecules 63M near the fourth control electrode E4 are initially aligned such that their major axes are aligned in the first direction X. Further, the liquid crystal molecules 63M are aligned such that their major axes are aligned along an electric field in a state where the electric field is formed.

As an example, a case where the voltage of the third control electrodes E31, E33, and E35 is 6V, and the voltage of the third control electrodes E32 and E34 and the fourth control electrode E4 is 0V will be described below. In each of regions in which the third control electrodes E31, E33, and E35 are opposed to the fourth control electrode E4, an electric field along the third direction Z is formed. Therefore, the liquid crystal molecules 63M are vertically aligned such that their major axes are aligned along the third direction Z. In each of regions in which the third control electrodes E32 and E34 are opposed to the fourth control electrode E4, an electric field is not formed. Therefore, the liquid crystal molecules 63M are maintained in the initial alignment state, and twisted-aligned.

Here, a case where the first polarized light POL1 enters the modulation element MD is assumed. Of beams of the first polarized light POL1 which enter from the fourth substrate 62, a beam of the first polarized light POL1, which enters a region in which the third control electrode E32 and the fourth control electrode E4 are opposed to each other, is affected by the twisted-aligned liquid crystal molecules 63M, and the polarization plane is rotated. Thus, after the above first polarized light POL1 passes through the second liquid crystal layer 63, it is converted into the second polarized light POL2 having an oscillation plane along the second direction Y. Similarly in the region in which the third control electrode E34 is opposed to the fourth control electrode E4, the transmitted light is converted into the second polarized light POL2. Meanwhile, the first polarized light POL1 incident on a region in which the third control electrode E33 and the fourth control electrode E4 are opposed to each other is hardly affected by the liquid crystal molecules 63M that are vertically aligned. Thus, the above first polarized light POL1 passes through the second liquid crystal layer 63 while maintaining its polarization plane. Similarly in the regions in which the third control electrodes E31 and E35 are opposed to the fourth control electrode E4, the transmitted light is the first polarized light POL1.

In other words, regions in which the third control electrodes E31, E33, and 535 are opposed to the fourth control electrode E4 correspond to the non-modulation portions NMA shown in FIG. 6, and regions in which the third control electrodes E32 and E34 are opposed to the fourth control electrode E4 correspond to the modulation portions MA shown in FIG. 6.

In the present embodiment, as an example of the modulation element MD, a system obtained by a combination of the second liquid crystal layer 63 including liquid crystal molecules twisted-aligned in the initial alignment state and an electric field produced along a direction intersecting the substrate main surface has been explained. However, the modulation element MD is not limited to the above. That is, as long as the system can form a region which modulates the incident light in accordance with a voltage applied to the second liquid crystal layer 63, and a region which transmits the incident light without modulating the same, such a system is applicable to the modulation element MD described above.

In the example explained above, since each of the third control electrodes E31 to E35 is a strip electrode extending in the second direction Y, the modulation portion MA and the non-modulation portion NMA are formed in a strip shape extending in the second direction Y. Alternatively, the third control electrodes E3 may be a strip electrode extending in the first direction X, and in this case, the modulation portion MA and the non-modulation portion NMA are formed in a strip shape extending in the first direction X. Further, the third control electrodes E3 may be arranged in a matrix likewise the first control electrodes E1 shown in FIG. 12, and in this case, the modulation portion MA and the non-modulation portion NMA can be formed in a free shape such as a dot shape or a strip shape.

Figure 16:
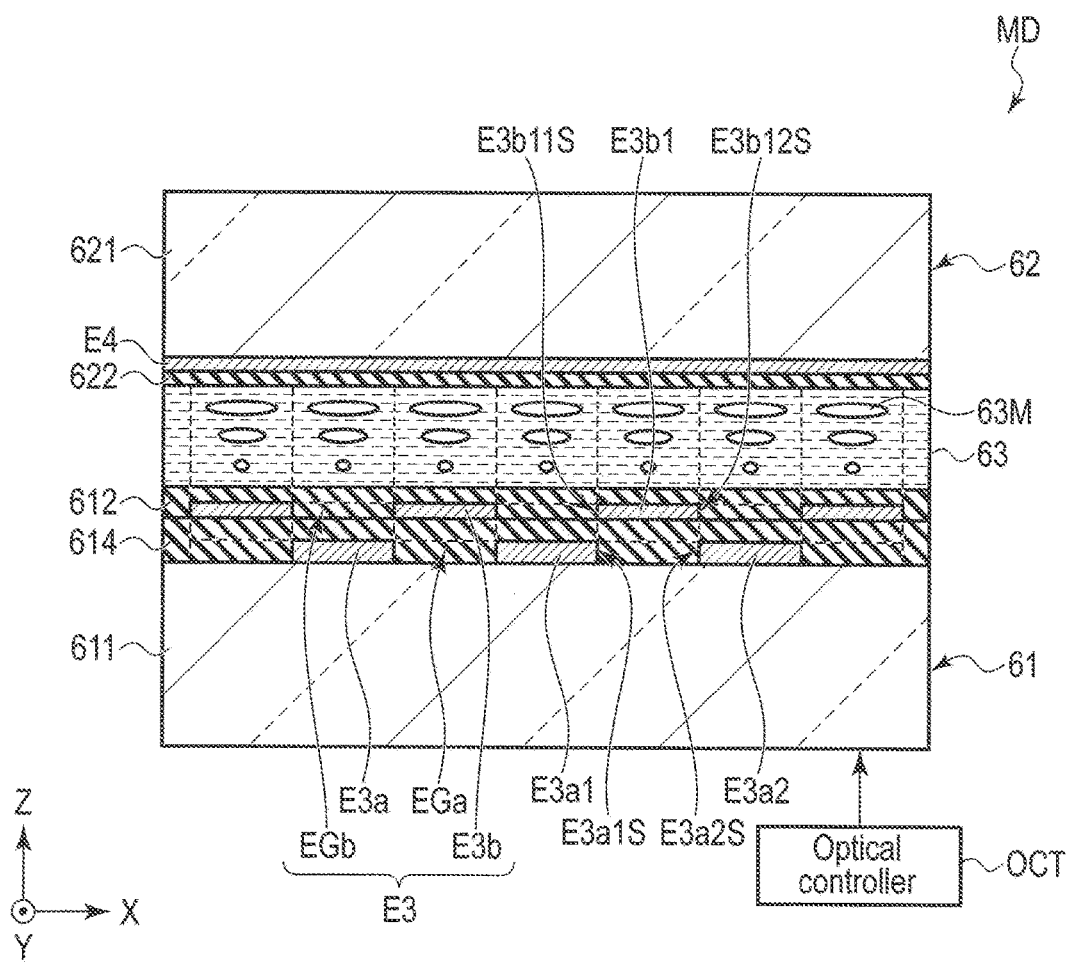
FIG. 16 is a cross-sectional view showing another configuration example of the modulation element MD.

FIG. 16 is a cross-sectional view showing another configuration example of the modulation element MD.

The configuration example shown in FIG. 16 is different from the configuration example shown in FIG. 14 in that the third control electrode E3 is formed in two layers. More specifically, the third control electrode comprises a first gap portion EGa, a first electrode portion E3$a$, a second gap portion EGb and a second electrode portion E3$b$. The first gap portion EGa and the first electrode portion E3$a$ are located between the insulating substrate 611 and an interlayer insulating film 614. The second gap portion EGb and the second electrode portion E3$b$ are located between the interlayer insulating film 614 and the alignment film 612. Further, the second gap portion EGb is located directly above the first electrode portion E3$a$ in the third direction Z. The second electrode portion E3$b$ is located directly above the first gap portion EGa in the third direction Z. In other words, a gap between adjacent first electrode portions E3$a$ is supplemented with the second electrode portion E3$b$, and a gap between adjacent second electrode portions E3$b$ is supplemented with the first electrode portion E3$a$.

In the following, an explanation will be provided from the other perspective. Here, an explanation will be given by focusing on two of the first electrode portions E3$a$1 and E3$a$2, and a second electrode portion E3$b$1. The first electrode portions E3$a$1 and E3$a$2 are arranged in the first direction X, and include end portions E3$a$1S and E3$a$2S which are opposed to each other. The second electrode portion E3$b$1 is located between the first electrode portions E3$a$1 and E3$a$2, and includes end portions E3$b$11S and E3$b$12S. The end portion E3$b$11S is located directly above the end portion E3$a$1S in the third direction Z. The end portion E3$b$12S is located directly above the end portion E3$a$2S in the third direction Z.

Consequently, the third control electrodes E3 are formed without having a gap in the first direction X. Accordingly, when the modulation portion MA and the non-modulation portion NMA are formed by using the third control electrodes E3 arranged in the first direction X, a gap is not formed between the adjacent third control electrodes E3. In other words, the modulation portion MA and the non-modulation portion NMA which are extended continuously in the first direction X can be formed.

Meanwhile, as described above, the optical controller OCT controls not only the liquid crystal element LD, but also the modulation element MD structured by the liquid crystal element. In the following, an example of control of the liquid crystal element LD and the modulation element MD will be described.

FIG. 17 is an illustration for explaining a first control example related to the liquid crystal element LD.

First, the optical controller OCT determines an incident direction of light incident on the liquid crystal element LD, on the basis of an output or like from a photosensor not described in detail (step ST31). Further, the optical controller OCT controls the liquid crystal element LD, and forms the lens 5 such that the light entering in the incident direction which has been determined converges to the modulation portion MA (step ST32). As described above, as the optical controller OCT controls the voltage applied to the first control electrode E1 and the second control electrode E2, the lens 5 of a desired shape can be formed, and the convergence position of the incident light can be controlled freely. In other words, the optical controller OCT controls the voltage applied to the first control electrode E1 and the second control electrode E2 in order to form the lens 5 of a desired shape whereby the modulation portion MA corresponds to the convergence position. By the above control, even if the positions of the modulation portion MA and the non-modulation portion NMA are fixed, the convergence position of the incident light obtained by the lens 5 can be matched with the position of the modulation portion MA.

According to the first control example, even if the position of the modulation portion MA is fixed, light incident on the liquid crystal element LD (mainly the first polarized light POL1) can be converged to the modulation portion MA, regardless of the incident direction of the light, and the polarization directions of light beams which have passed through the modulation element MD can be made substantially uniform.

FIG. 18 is an illustration for explaining a second control example related to the modulation element MD.

First, the optical controller OCT determines the incident direction of light incident on the liquid crystal element LD, on the basis of an output or like from a photosensor not described in detail (step ST41). Further, the optical controller OCT controls the modulation element MD, and forms the modulation portion MA at a place where the light entering in the determined incident direction is converged by the lens 5 (step ST42). As described above, as the optical controller OCT controls the voltage applied to the third control electrode E3 and the fourth control electrode E4, the modulation portion MA and the non-modulation portion NMA can be formed at desired positions. When the shape of the lens 5 is fixed, the convergence position is shifted in accordance with the incident direction of light entering the lens 5. In the second control example explained in this specification, the position of the modulation portion MA is changed so that the modulation portion MA follows the convergence position which is shifted in accordance with the incident direction of light, in a case where the shape of the lens 5 is not varied. In other words, the optical controller OCT controls the voltage applied to the third control electrode E3 and the fourth control electrode E4 so as to form the modulation portion MA at the convergence position of the incident light. By the above control, even if the shape of the lens 5 is fixed, the convergence position of the incident light obtained by the lens 5 can be matched with the position of the modulation portion MA.

Also in this second control example, an advantage similar to that of the first control example shown in FIG. 17 can be obtained. Further, the first control example and the second control example may be combined. When the liquid crystal element LD and the modulation element MD are fixed, even if the modulation element MD is displaced relative to the liquid crystal element LD in the first direction X, by applying at least one of the first control example and the second control example, a displacement of the convergence position along the first direction X can be corrected. Also, even if variations in the interval between the liquid crystal element LD and the modulation element MD in the third direction Z are exhibited, by applying the first control example, variations in the focusing distance of the lens 5 along the third direction Z can be corrected.

Next, the display panel 1 which can be applied to the display device DSP of the present embodiment will be explained.

FIG. 19 is an illustration showing a basic structure and an equivalent circuit of the display panel 1.

The display panel 1 includes a display area DA in which an image is displayed, and a non-display area NDA which surrounds the display area DA. The display area DA comprises a plurality of pixels PX. Here, the pixel indicates a minimum unit which can be individually controlled in accordance with a pixel signal, and exists in, for example, an area including a switching element arranged at a position where a scanning line and a signal line, which will be described later, cross each other. The pixels PX are arrayed in a matrix in the first direction X and the second direction Y. Also, the display panel 1 includes scanning lines (also referred to as gate lines) G (G1 to Gn), signal lines (also referred to as data lines or source lines) S (S1 to Sm), a common electrode CE, etc., in the display area DA. The scanning lines G extend in the first direction X, and are arranged in the second direction Y. The signal lines S extend in the second direction Y, and are arranged in the first direction X. Note that the scanning lines G and the signal lines S do not necessarily extend linearly, but may be partially bent. The common electrode CE is disposed over the pixels PX. The scanning lines G are connected to a scanning line drive circuit GD, the signal lines S are connected to a signal line drive circuit SD, and the common electrode CE is connected to a common electrode drive circuit CD. The scanning line drive circuit GD, the signal line drive circuit SD, and the common electrode drive circuit CD are controlled by the controller CT.

Each of the pixels PX comprises a switching element SW, a pixel electrode PE, the common electrode CE, a third liquid crystal layer LC, and the like. The switching element SW is constituted by a thin-film transistor (TFT), for example, and is electrically connected to the scanning line G and the signal line S. More specifically, the switching element SW includes a gate electrode WG, a source electrode WS, and a drain electrode WD. The gate electrode WG is electrically connected to the scanning ling G. In the example illustrated, the electrode electrically connected to the signal line S is referred to as the source electrode WS, and the electrode electrically connected to the pixel electrode PE is referred to as the drain electrode WD. The scanning line G is connected to the switching elements SW of the respective pixels PX arranged in the first direction X. The signal line S is connected to the switching elements SW of the respective pixels PX arranged in the second direction Y.

The pixel electrode PE is electrically connected to the switching element SW. The common electrode CE is opposed to a plurality of pixel electrodes PE. The pixel electrode PE and the common electrode CE function as a first display electrode and a second display electrode which apply a voltage to the third liquid crystal layer LC. The pixel electrode PE is formed of a transparent conductive material such as ITO or IZO, or a reflective metal material such as aluminum or silver. Further, the common electrode CE is formed of a transparent conductive material such as ITO or IZO. A storage capacitance CS is formed between, for example, the common electrode CE and the pixel electrode PE.

Although the details of the structure of the display panel 1 will not be described here, the display panel 1 has a structure corresponding to one of various modes including a twisted nematic (TN) mode, a polymer dispersed liquid crystal (PDLC) mode, an optically compensated bend (OCB) mode, an electrically controlled birefringence (ECB) mode, a vertically aligned (VA) mode, a fringe field switching (FFS) mode, and in-plane switching (IPS) mode. Also, while explanation has been provided for a case where each of the pixels PX is driven by an active method, the pixels PX may be driven by a passive method.

A photosensor 22 is incorporated in the display panel 1. In the example illustrated, the photosensor 22 is arranged in the non-display area NDA. The photosensor 22 outputs a signal according to the intensity of the received light. The photosensor 22 is controlled by the display controller DCT. The display controller DCT measures the output from the photosensor.

FIG. 20 is a cross-sectional view showing a configuration example of the display panel 1 shown in FIG. 19. In the figure, only the structures necessary for the explanation are depicted.

The display panel 1 comprises a fifth substrate SUB1, a sixth substrate SUB2, and the third liquid crystal layer LC.

The fifth substrate SUB1 comprises an insulating substrate 100, an insulating film 110, an alignment film 120, the switching element SW, the pixel electrode PE, etc. The insulating substrate 100 and the insulating film 110 are both transparent. The switching element SW is disposed between the insulating substrate 100 and the insulating film 110. The pixel electrode PE is arranged between the insulating film 110 and the alignment film 120, and is electrically connected to the switching element SW. In one example, the pixel electrode PE is a reflective electrode, and is formed of a reflective metal material such as aluminum or silver. The fifth substrate SUB1 comprises the scanning line G, the signal line S, the switching element SW, etc., shown in FIG. 19, although this is not illustrated in the drawing.

The sixth substrate SUB2 comprises an insulating substrate 200, a light-shielding layer 210, a color filter 220, an overcoat layer 230, an alignment film 240, the common electrode CE, etc. The insulating substrate 200 is transparent. The light-shielding layer 210 is disposed between the insulating substrate 200 and the color filter 220. The color filter 220 is disposed between the light-shielding layer 210 and the overcoat layer 230. The overcoat layer 230 covers the color filter 220. The common electrode CE is disposed between the overcoat layer 230 and the alignment film 240. The common electrode CE is a transparent electrode formed of ITO, etc.

The third liquid crystal layer LC is held between the fifth substrate SUB1 and the sixth substrate SUB2, and includes liquid crystal molecules LM located between the alignment film 120 and the alignment film 240. In one example, the thickness of the third liquid crystal layer LC is approximately 2 to 4 μm.

The optical element OD is located on a side opposite to a surface in contact with the liquid crystal layer LC of the sixth substrate SUB2. The optical element OD includes, for example, a scattering layer FS, a retardation film RT, and a polarizer PL. The scattering layer FS is bonded to the insulating substrate 200, the retardation film RT is stacked on the scattering layer FS, and the polarizer PL is stacked on the retardation film RT. The polarizer PL includes a transmission axis T which transmits the second polarized light POL2. Note that the structure of the optical element OD is not limited to the example illustrated.

The scattering layer FS is an anisotropic scattering layer which scatters light entering in a particular direction. In the example illustrated, the scattering layer FS has the function of transmitting the incident light from the optical device 2 practically without scattering it, and scattering the light reflected by the pixel electrodes PE. It is desirable to stack a plurality of scattering layers FS in order to extend the range of scattering, prevent iridescent color, and the like. The retardation film RT functions as a quarter-wave plate. In one example, the retardation film RT is a stacked layer body constituted by a quarter-wave plate and a half-wave plate, and is composed to reduce a wavelength dependency and obtain a desired retardation within a wavelength range used for color display.

The pixel electrode PE and the common electrode CE apply a voltage to the third liquid crystal layer LC. Consequently, a retardation of the third liquid crystal layer LC is changed. More specifically, in an off-state in which a voltage is not applied to the third liquid crystal layer LC and an on-state in which a voltage is applied to the third liquid crystal layer LC, the alignment state of the liquid crystal molecules LM differs, and the retardation is changed. In a reflective display panel in which the pixel electrode PE is a reflective electrode and the common electrode CE is a transparent electrode, by a difference in the retardation between the on-state and the off-state, the external light incident through the sixth substrate SUB2 is selectively reflected, and an image is displayed.

More specifically, although the optical device 2 transmits the first polarized light POL1 and the second polarized light POL2, as has been explained with reference to FIG. 7, etc., most of the transmitted light is the second polarized light POL2. The polarizer PL of the optical element OD transmits the second polarized light POL2 of the light transmitted from the optical device 2. Accordingly, the display panel 1 is illuminated by the second polarized light POL2. In the on-state, the light incident on the display panel 1 passes through the third liquid crystal layer LC after being reflected by the pixel electrode PE, and passes through the optical element OD. Thus, in the on-state, color of the color filter 220 is displayed. Meanwhile, in the off-state, the light incident on the display panel 1 passes through the third liquid crystal layer LC after being reflected by the pixel electrode PE, and is absorbed by the optical element OD. Accordingly, in the off-state, black is displayed.

According to the above-described display device DSP, the optical device 2 converts the first polarized light POL1 into the second polarized light POL2, of the external light incident on the display device DSP, and transmits most of the second polarized light POL2. Since the optical element OD includes the transmission axis T which transmits the second polarized light POL2, the display panel 1 is illuminated by the second polarized light POL2 which has passed through the optical device 2. Accordingly, of the external light incident on the display device DSP, a component (the second polarized light POL2) which passes through the optical element OD can be increased. As a result, the efficiency of use of light can be improved. Also, light which illuminates the display panel 1 is increased, and the reflectance of the display panel 1 can be improved.

FIG. 21 is an illustration for explaining a method of determining a drive condition of the optical device 2 in the display device DSP of the present embodiment. In the example illustrated, the optical controller OCT drives the optical device 2 similarly in both of a region 2A opposed to the display area DA of the display panel 1, and a region 2B opposed to the non-display area NDA. The optical device 2 comprises the liquid crystal element LD and the modulation element MD, as has been explained with reference to FIG. 7, though not described in detail.

Polarization directions of light beams of natural light, which enters the display device DSP from an external light source LS, are made substantially uniform by the optical device 2. The second polarized light POL2 which has passed through the optical device 2 illuminates the display panel 1. Part of the illumination light of the display panel 1 enters the photosensor 22. The photosensor 22 outputs a signal according to the intensity of the received light to the display controller DCT. The display controller DCT outputs a result of measurement of the output from the photosensor 22 to the optical controller OCT. The optical controller OCT controls the optical device 2 such that the output from the photosensor 22 is represented by a desired value (for example, the maximum value). For the control of the optical device 2, the first control example shown in FIG. 17 and the second control example shown in FIG. 18 can be applied.

FIG. 22 is an illustration for explaining another method of determining the drive condition of the optical device 2 in the display device DSP of the present embodiment. In the example illustrated, the light source LS and a light receiving element R are opposed to the display device DSP. The light source LS generates reference light for illuminating the display device DSP. The light receiving element R receives the reference light reflected from the display device DSP, and outputs a signal according to the intensity of the received light. In one example, a signal output from the light receiving element R is input to the optical controller OCT. The optical controller OCT controls the optical device 2 such that the output from the light receiving element R is represented by a desired value (for example, the maximum value). For the control of the optical device 2, the first control example and the second control example described above can be applied.

As described above, by optimizing the optical device 2, display quality of an image reflectively displayed on the display panel 1 can be improved. For example, when it is requested that a bright image be displayed, the optical device 2 is controlled such that the output from the photosensor 22 or the light receiving element R is represented by the maximum value. Alternatively, when it is requested that visibility of a reflectively displayed image be improved, the optical device 2 is controlled such that the external light source LS is not visually recognized from an observer.

Next, a method of controlling the amount of light incident on the display panel 1 (i.e., which may be referred to as an incident light amount) by the optical device 2 will be explained.

FIG. 23 is an illustration showing the optical device 2 controlled such that the amount of light incident on the display panel 1 is maximized. The optical controller OCT controls the liquid crystal element LD by switching the mode to the first mode. More specifically, the optical controller OCT applies a voltage for forming the lens 5 to the first control electrode E1 and the second control electrode E2 (on-state). In this way, the first polarized light POL1 is converged by the lens 5, as shown in the left side of the drawing, and almost all of the first polarized light POL1 enters the modulation portion MA, and is converted into the second polarized light POL2. Meanwhile, the second polarized light POL2 is hardly converged by the lens 5, as shown in the right side of the drawing, and enters each of the modulation portion MA and the non-modulation portion NMA. The second polarized light POL2 incident on the non-modulation portion NMA passes through the modulation element MD without being modulated. Further, part of the second polarized light POL2 enters the modulation portion MA, and is converted into the first polarized light POL1.

The optical element OD including the polarizer PL includes the transmission axis T which transmits the second polarized light POL2. Accordingly, the second polarized light POL2 which has passed through the modulation element MD illuminates the display panel 1 without being absorbed by the optical element OD. The first polarized light POL1 which has passed through the modulation element MD is absorbed by the optical element OD, or reflected by the optical element OD. When a general type of polarizer is applied, of the light incident on the optical device 2, only 50% of the light at the maximum reaches the display panel 1. Meanwhile, in the case of the example shown in FIG. 23, of the light incident on the optical device 2, more than 50% of the light reaches the display panel 1.

Note that in the present specification, a case where all of the first polarized light POL1 incident on the optical device 2 is converged to the modulation portion MA has been explained. However, by controlling the shape of the lens 5, an amount of the first polarized light POL1 converged to the modulation portion MA can be adjusted. By reducing the amount of the first polarized light POL1 incident on the modulation portion MA as compared to that of the example illustrated in FIG. 23, the amount of light which reaches the display panel 1 can be adjusted.

Figure 24:
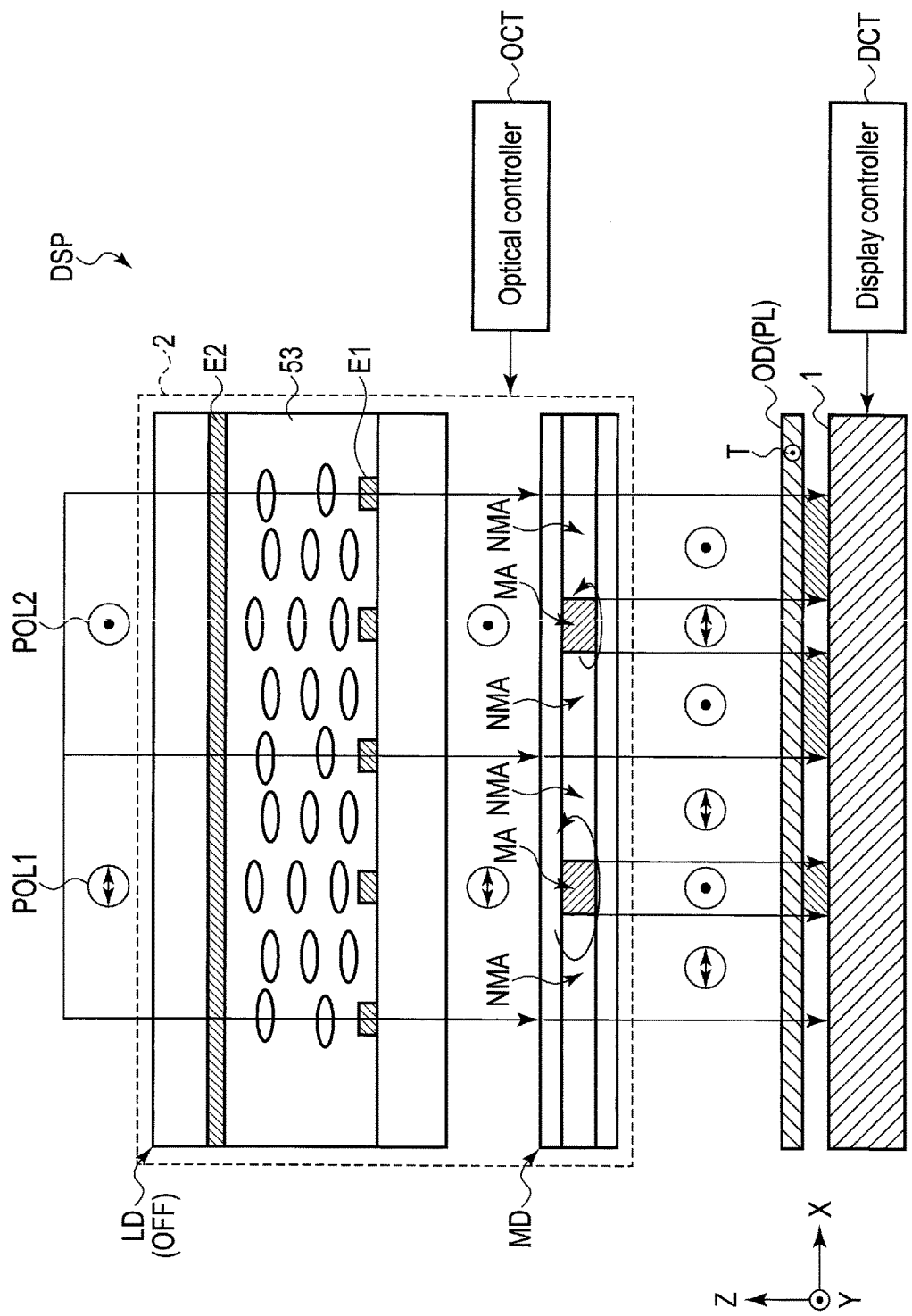
FIG. 24 is an illustration showing the optical device 2 controlled such that the amount of light incident on the display panel 1 is minimized.

FIG. 24 is an illustration showing the optical device 2 controlled such that the amount of light incident on the display panel 1 is minimized. The optical controller OCT controls the liquid crystal element LD by switching the mode to the second mode. More specifically, the optical controller OCT does not apply a voltage for forming the lens 5 to the first control electrode E1 and the second control electrode E2 (off-state). Accordingly, the lens 5 is not formed in the liquid crystal element LD. The first polarized light POL1 and the second polarized light POL2 both enter the modulation element MD without being converged. In the modulation element MD, the first polarized light POL1 which entered the modulation portion MA is converted into the second polarized light POL2, and the second polarized light POL2 which entered the modulation portion MA is converted into the first polarized light POL1. Amounts of the first polarized light POL1 and the second polarized light POL2 which have passed through the modulation element MD are equal to each other. The second polarized light POL2 which has passed through the modulation element MD illuminates the display panel 1 without being absorbed by the optical element OD. The first polarized light POL1 which has passed through the modulation element MD is absorbed by the optical element OD. In this case, of the light incident on the optical device 2, approximately 50% of the light reaches the display panel 1.

According to the display device DSP of the present embodiment, the optical device 2 can suppress the amount of light incident on the display panel 1. Accordingly, when a low gradation image is to be displayed on the display panel 1, the number of gradation levels that can be expressed on a low-gradation-side can be increased. For example, the display device DSP analyzes image data corresponding to the image to be displayed on the display panel 1, and distinguishes between a high gradation region which displays a high gradation image and a low gradation region which displays a low gradation image. Further, the first mode explained referring to FIG. 23 is applied to the high gradation region, and the second mode explained referring to FIG. 24 is applied to the low gradation region. Consequently, the efficiency of use of light can be improved for the high gradation region, and the number of gradation levels that can be expressed can be increased in the low gradation region, whereby the display quality can be improved.

In one example, a case where the display panel 1 is driven for 2-bit display (i.e., in $2^2(=4)$ ways) is assumed. An explanation will be given below assuming that the maximum amount of light incident on the display panel 1 is 100%, and the minimum amount of incident light is 50%.

Figures 25, 26:
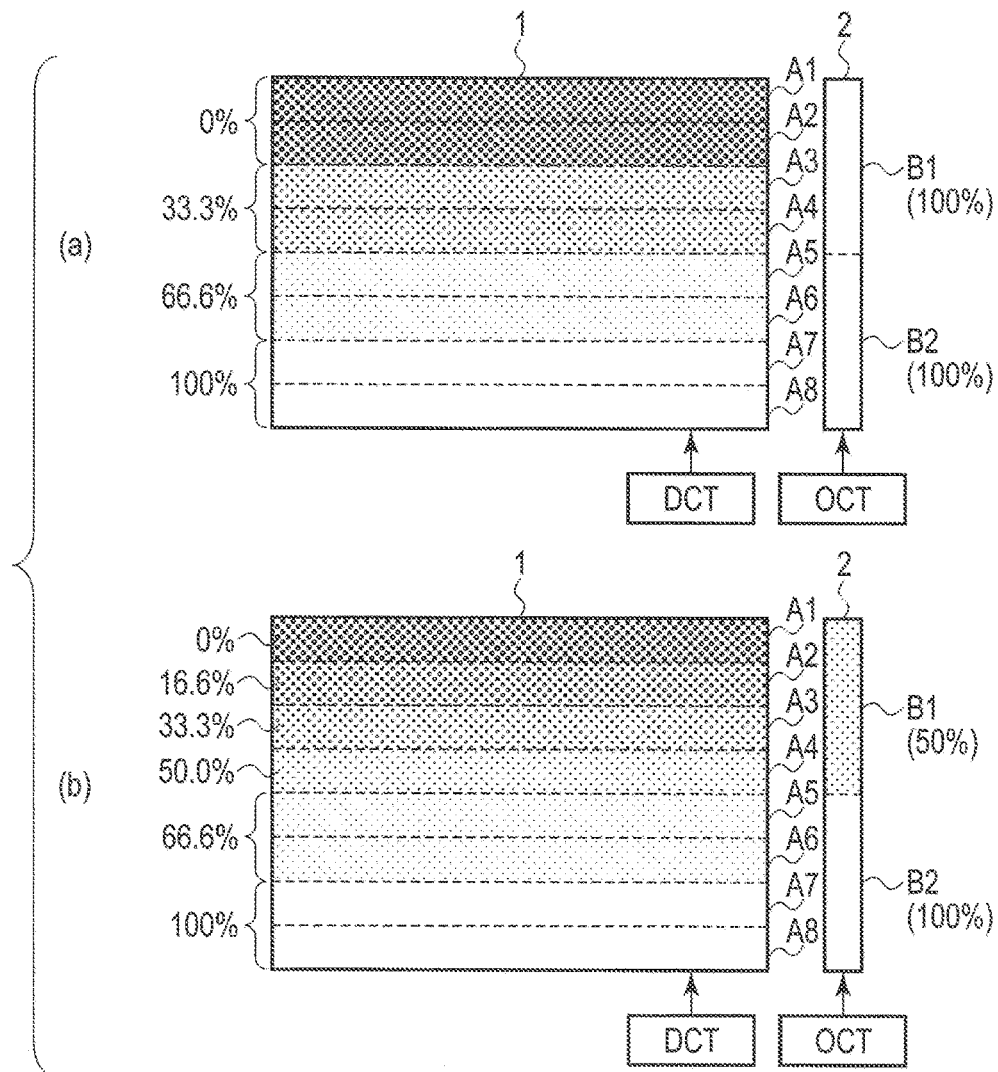
FIG. 25 is a table in which reflectances that can be realized in the display device DSP of the present embodiment are summarized.
FIG. 26 is an illustration for explaining gradation display by the display device DSP of the present embodiment.

FIG. 25 is a table in which reflectances that can be realized in the display device DSP of the present embodiment are summarized. In the display panel 1, when the incident light amount is 100%, the reflectance is 0% at a gradation value that is 0, the reflectance is 33.3% at a gradation value that is 1, the reflectance is 66.6% at a gradation value that is 2, and the reflectance is 100% at a gradation value that is 3. Further, in the display panel 1, when the incident light amount is 50%, the reflectance is 0% at the gradation value that is 0, the reflectance is 16.6% at the gradation value that is 1, the reflectance is 33.3% at the gradation value that is 2, and the reflectance is 50% at the gradation value that is 3. In other words, even in a case where the display panel 1 is driven for two-bit display, by controlling the amount of light incident on the display panel 1, gradation can be expressed at substantially six levels.

FIG. 26 is an illustration for explaining the gradation display by the display device DSP of the present embodiment. In the example illustrated, the display panel 1 includes areas A1 to A8, and the optical device 2 includes areas B1 and B2. Area B1 is opposed to areas A1 to A4, and area B2 is opposed to areas A5 to A8. Areas A1 to A8 each include a plurality of pixels PX arranged in a matrix as shown in FIG. 19. In one example, area A1 corresponds to a first display area, area A5 corresponds to a second display area, area B1 corresponds to a first control area, and area B2 corresponds to a second control area.

In an example shown in FIG. 26(a), the optical controller OCT sets areas B1 and B2 to the first mode to form the lens 5 in the first liquid crystal layer 53, as shown in FIG. 23. This example corresponds to a case where the amount of light incident on the entire surface of the display panel 1 from the optical device 2 is 100%. The display controller DCT sets a first area A1 and a second area A2 to correspond to the gradation value that is 0, sets a third area A3 and a fourth area A4 to correspond to the gradation value that is 1, sets a fifth area A5 and a sixth area A6 to correspond to the gradation value that is 2, and sets a seventh area A7 and an eighth area A8 to correspond to the gradation value that is 3, of the display panel 1. In this case, the reflectances at the first area A1 and the second area A2 are 0%, the reflectances at the third area A3 and the fourth area A4 are 33.3%, the reflectances at the fifth area A5 and the sixth area A6 are 66.6%, and the reflectances at the seventh area A7 and the eighth area A8 are 100%.

In an example shown in FIG. 26(b), the optical controller OCT sets area B1 to the second mode, so that the lens is not formed in the first liquid crystal layer 53, as shown in FIG. 24. Further, the optical controller OCT sets area B2 to the first mode to form the lens 5 in the first liquid crystal layer 53. This example corresponds to a case where the amount of light incident on the first to fourth areas is 50%, and the amount of light incident on the fifth to eighth areas is 100%, of the display panel 1. The display controller DCT sets the first area A1 to correspond to the gradation value that is 0, sets the second area A2 to correspond to the gradation value that is 1, sets the third area A3 to correspond to the gradation value that is 2, sets the fourth area A4 to correspond to the gradation value that is 3, sets the fifth area A5 and the sixth area A6 to correspond to the gradation value that is 2, and sets the seventh area A7 and the eighth area A8 to correspond to the gradation value that is 3, of the display panel 1. In this case, the reflectance at the first area A1 is 0%, the reflectance at the second area A2 is 16.6%, the reflectance at the third area A3 is 33.3%, the reflectance at the fourth area A4 is 50%, the reflectances at the fifth area A5 and the sixth area A6 are 66.6%, and the reflectances at the seventh area A7 and the eighth area A8 are 100%.

As described above, according to the display device DSP of the present embodiment, by combining the display panel 1 which is driven for gradation display and the optical device 2 which controls the amount of light incident on the display panel 1, an image can be expressed with more levels of gradation than those achievable by the display panel 1 alone. In particular, since the number of gradation levels that can be expressed on the low-gradation-side can be increased, not only can the display quality of black display be improved, but a dynamic range on the low-gradation-side can also be broadened.

As explained above, according to the present embodiment, an optical device and a display device capable of improving the efficiency of use of light can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. An optical device, comprising:
a liquid crystal element comprising a first substrate comprising a plurality of first control electrodes, a second substrate which is opposed to the first substrate and comprises a second control electrode, and a first liquid crystal layer held between the first substrate and the second substrate; and
a modulation element opposed to the liquid crystal element, the modulation element comprising a modulation portion which modulates incident light, and a non-modulation portion which is adjacent to the modulation portion, wherein
the modulation element comprises a third substrate comprising a third control electrode, a fourth substrate which is opposed to the third substrate and comprises a fourth control electrode, and a second liquid crystal layer held between the third substrate and the fourth substrate, and
the third control electrode comprises a first gap portion, a first electrode portion, a second electrode portion which is located directly above the first gap portion, and a second gap portion which is located directly above the first electrode portion.

2. The optical device of claim 1, wherein the modulation portion is smaller than the non-modulation portion.

3. The optical device of claim 2, further comprising:
a controller which controls the liquid crystal element, wherein
the controller forms a lens which converges light incident on the liquid crystal element to the modulation portion.

4. The optical device of claim 3, wherein
first transmitted light, which is light transmitted through the liquid crystal element, and second transmitted light, which is light transmitted through the modulation element, include first polarized light and second polarized light, respectively,
a first ratio of the first polarized light in the second transmitted light is smaller than a second ratio of the first polarized light in the first transmitted light, and
a third ratio of the second polarized light in the second transmitted light is larger than a fourth ratio of the second polarized light in the first transmitted light.

5. The optical device of claim 1, wherein
each of the first control electrodes is a strip electrode, and
the modulation portion is located between two first control electrodes.

6. The optical device of claim 5, wherein a width of each of the first control electrodes is less than or equal to an interval between the first control electrodes adjacent to each other.

7. The optical device of claim 6, wherein each of the first control electrodes and the second control electrode are transparent electrodes.

8. The optical device of claim 1, wherein a polarizer is nonexistent between the liquid crystal element and the modulation element.

9. The optical device of claim 1, wherein the first liquid crystal layer has a thickness of 10 to 100 μm.

10. The optical device of claim 1, wherein
the modulation portion and the non-modulation portion are formed in the second liquid crystal layer.

11. The optical device of claim 10, further comprising:
a controller which controls the liquid crystal element and the modulation element, wherein
the controller forms a lens, which converges light incident on the liquid crystal element, in the first liquid crystal layer, and forms the modulation portion in an area of the second liquid crystal layer where the light is converged by the lens.

12. A display device, comprising:
a liquid crystal element comprising a first substrate comprising a plurality of first control electrodes, a second substrate which is opposed to the first substrate and comprises a second control electrode, and a first liquid crystal layer held between the first substrate and the second substrate;

a modulation element which is opposed to the liquid crystal element, the modulation element comprising a modulation portion which modulates first polarized light and second polarized light, and a non-modulation portion which is adjacent to the modulation portion;

an optical element which is opposed to the modulation element, and transmits the second polarized light;

a liquid crystal display panel which is opposed to the optical element, and is illuminated by the second polarized light; and a display controller which controls the liquid crystal display panel including a first display area and a second display area, and an optical controller which controls the liquid crystal element including a first control area and a second control area, wherein the first control area is opposed to the first display area, the second control area is opposed to the second display area, the display controller displays a first image of a first gradation value in the first display area, and displays a second image of a second gradation value in the second display area, the second gradation value being different from the first gradation value, and the optical controller forms no lens in the first control area of the first liquid crystal layer, and forms a lens, which converges light incident on the liquid crystal element to the modulation portion, in the second control area of the first liquid crystal layer.

13. The display device of claim 12, wherein the modulation element comprises a third substrate comprising a plurality of third control electrodes, a fourth substrate which is opposed to the third substrate and comprises a fourth control electrode, and a second liquid crystal layer held between the third substrate and the fourth substrate, and the modulation portion and the non-modulation portion are formed in the second liquid crystal layer.

14. The display device of claim 13, wherein the liquid crystal display panel comprises a fifth substrate, a sixth substrate, a third liquid crystal layer held between the fifth substrate and the sixth substrate, and a pixel electrode and a common electrode which apply a voltage to the third liquid crystal layer, and the pixel electrode is a reflective electrode, and the common electrode is a transparent electrode.

15. A display device, comprising:

a liquid crystal element comprising a first substrate comprising a plurality of first control electrodes, a second substrate which is opposed to the first substrate and comprises a second control electrode, and a first liquid crystal layer held between the first substrate and the second substrate;

a modulation element which is opposed to the liquid crystal element, the modulation element comprising a modulation portion which modulates first polarized light and second polarized light, and a non-modulation portion which is adjacent to the modulation portion;

an optical element which is opposed to the modulation element, and transmits the second polarized light; and a liquid crystal display panel which is opposed to the optical element, and is illuminated by the second polarized light, wherein the modulation element comprises a third substrate comprising a plurality of third control electrodes, a fourth substrate which is opposed to the third substrate and comprises a fourth control electrode, and a second liquid crystal layer held between the third substrate and the fourth substrate, the modulation portion and the non-modulation portion are formed in the second liquid crystal layer, the liquid crystal display panel comprises a fifth substrate, a sixth substrate, a third liquid crystal layer held between the fifth substrate and the sixth substrate, and a pixel electrode and a common electrode which apply a voltage to the third liquid crystal layer, and the pixel electrode is a reflective electrode, and the common electrode is a transparent electrode.

* * * * *